United States Patent
Toi et al.

(10) Patent No.: US 12,224,634 B2
(45) Date of Patent: Feb. 11, 2025

(54) STATOR OF ROTARY ELECTRIC MACHINE

(71) Applicants: Kabushiki Kaisha Toshba, Tokyo (JP); Toshiba Infrastructure Systems & Solutions Corporation, Kawasaki (JP)

(72) Inventors: Takahiro Toi, Yokohama Kanagawa (JP); Hiroaki Makino, Fuchu Tokyo (JP); Minoru Awazu, Yokohama Kanagawa (JP); Makoto Matsushita, Fuchu Tokyo (JP); Kazuya Yasui, Houston, TX (US); Masaru Kano, Novi, MI (US)

(73) Assignees: Kabushiki Kaisha Toshiba, Tokyo (JP); Toshiba Infrastructure Systems & Solutions Corporation, Kawasaki Kanagawa (JP)

( * ) Notice: Subject to any disclaimer, the term of this patent is extended or adjusted under 35 U.S.C. 154(b) by 262 days.

(21) Appl. No.: 18/063,928

(22) Filed: Dec. 9, 2022

(65) Prior Publication Data
US 2023/0105198 A1    Apr. 6, 2023

Related U.S. Application Data

(63) Continuation of application No. PCT/JP2020/022741, filed on Jun. 9, 2020.

(51) Int. Cl.
*H02K 1/16* (2006.01)
*H02K 3/12* (2006.01)
(Continued)

(52) U.S. Cl.
CPC ............... *H02K 3/12* (2013.01); *H02K 1/16* (2013.01); *H02K 3/28* (2013.01); *H02K 3/48* (2013.01)

(58) Field of Classification Search
CPC .. H02K 1/16; H02K 3/04; H02K 3/12; H02K 3/14; H02K 3/28; H02K 3/48
See application file for complete search history.

(56) References Cited

U.S. PATENT DOCUMENTS

2008/0007133 A1    1/2008  Onimaru et al.
2012/0161567 A1    6/2012  Gorohata
(Continued)

FOREIGN PATENT DOCUMENTS

JP    2009-95193 A    4/2009
JP    4878002 B2      2/2012
(Continued)

*Primary Examiner* — Eric Johnson
(74) *Attorney, Agent, or Firm* — Finnegan, Henderson, Farabow, Garrett & Dunner, LLP

(57) ABSTRACT

According to one embodiment, a stator includes a stator core with slots, and multi-phase segment coils each including coil segments each including a first linear part and a second linear part arranged in different slots and a bridge part, the coil segment formed of a rectangular conductor. An innermost coil segment in the slot is structured with divided segments adhered together. Each divided segment includes a first linear part and a second linear part, and a bridge part, and is formed of a rectangular conductor cross-sectional area of which is smaller than the rectangular conductor of other coil segments. The bridge parts of the divided segments are arranged to cross each other in the radial direction.

7 Claims, 11 Drawing Sheets

(51) Int. Cl.
*H02K 3/28* (2006.01)
*H02K 3/48* (2006.01)

(56) References Cited

U.S. PATENT DOCUMENTS

| | | | |
|---|---|---|---|
| 2013/0026875 A1* | 1/2013 | Hao | H02K 3/12 |
| | | | 310/198 |
| 2014/0300239 A1 | 10/2014 | Takizawa et al. | |
| 2014/0354095 A1 | 12/2014 | Ishikawa et al. | |
| 2015/0028704 A1 | 1/2015 | Ohsawa et al. | |
| 2017/0133968 A1* | 5/2017 | Takahashi | H02K 3/345 |
| 2018/0152068 A1 | 5/2018 | Gotz et al. | |
| 2018/0152070 A1 | 5/2018 | Sheu et al. | |
| 2019/0149001 A1* | 5/2019 | Lee | H02K 3/12 |
| | | | 310/201 |

FOREIGN PATENT DOCUMENTS

| | | |
|---|---|---|
| JP | 2012-143068 A | 7/2012 |
| JP | 2012-186938 A | 9/2012 |
| JP | 2013-138594 A | 7/2013 |
| JP | 5434227 B2 | 3/2014 |
| JP | 5802581 B2 | 10/2015 |
| JP | 5854268 B2 | 2/2016 |
| JP | 5874554 B2 | 3/2016 |
| JP | 2017-184394 A | 10/2017 |
| JP | 2017-216832 A | 12/2017 |
| JP | 2018-85911 A | 5/2018 |
| JP | 6330656 B2 | 5/2018 |
| JP | 6491727 B2 | 3/2019 |
| WO | WO 2013/080731 A1 | 6/2013 |

* cited by examiner

STATOR OF ROTARY ELECTRIC MACHINE

CROSS-REFERENCE TO RELATED APPLICATIONS

This application is a Continuation Application of PCT Application No. PCT/JP2020/022741, filed Jun. 9, 2020, the entire contents of which are incorporated herein by reference.

FIELD

Embodiments described herein relate generally to a stator of a rotary electric machine.

BACKGROUND

Rotary electric machines include an annular stator and a rotor rotatably provided with a field magnetic area of the stator. The stator includes an annular stator core with a plurality of slots and multi-phase stator coils attached to the stator core. Such stator coils are structured with linear conductors arranged in the slots. In each slot, a plurality of linear conductors are aligned in a radial direction. The stator coil has coil ends projecting from both end surfaces of the stator core in an axial direction.

In recent years, in the stator of mobile driving rotary electric machines which are highly required for miniaturization, a coil structure in which U-shaped coil pieces (coil segments) formed of rectangular conductive strands are inserted into the slots of the stator core, end parts thereof are twisted and welded to form segment coils is adopted. By using the segment coils, usage ratio of in-slot space will be improved and size of the coil ends will be reduced as compared to the stator coil using slender round lines. By structuring the coil segment using wide diameter strand rectangular conductors, electric resistance is decreased, and low-loss in a low-speed rotation is achieved.

On the other hand, in a high-speed rotation, flowing current in the conductor and magnetic flux passing therethrough will have high-frequency, inducing eddy currents in the conductor, which may increase the loss. In response to such a case, multi-stranded rectangular conductors with thin strand diameters can be used to reduce the increase in loss. However, the increase in the number of strands increases the volume of the insulation, resulting in a decrease in the space utilization ratio in the slot, and as a result, there are problems between different rotation speed regions such that the loss reduction effect at low speeds cannot be achieved. In a case of multi-stranded linear conductors, in order to suppress the generation of eddy currents (reflux currents) in the coil, at least some of the divided multiple linear conductors are twisted in order to shift the position of the multiple linear conductor arrangement.

In the stator of the rotary electric machine structured as above, if at least part of the stator coil is multi-rowed, the coil end configuration becomes more complex due to the complicated drawing and twisting of the linear conductors.

DETAILED DESCRIPTION

Figure 1:
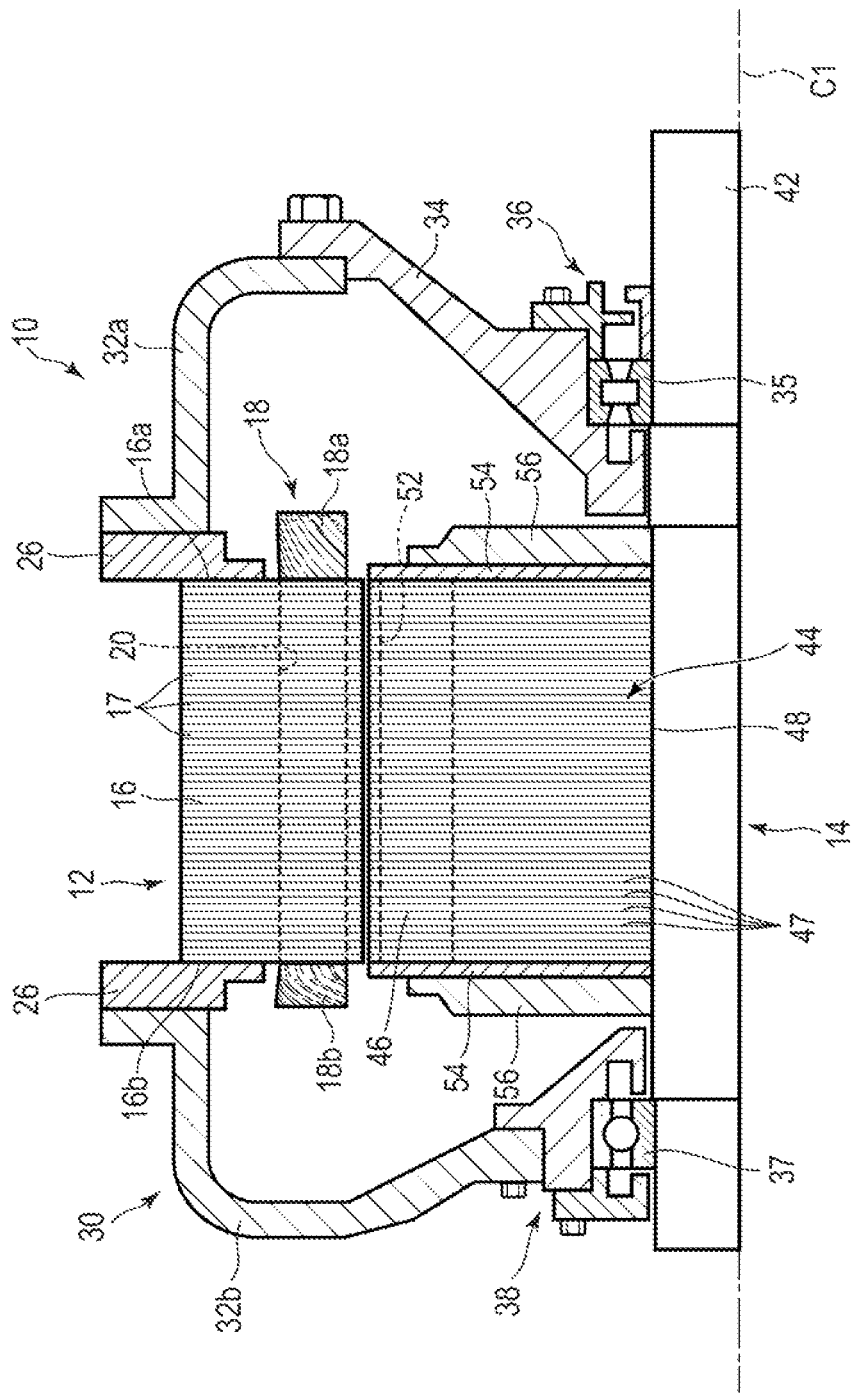
FIG. 1 is a vertical cross-sectional view of a rotary electric machine of a first embodiment.

Embodiments will be described hereinafter with reference to the accompanying drawings. In general, according to one embodiment, a stator of rotary electric machine, comprises a stator core including an annular yoke with a central axis line and a plurality of teeth extending from an inner periphery of the yoke, in which a slot is formed between adjacent teeth; and multi-phase segment coils each including a plurality of coil segments each comprising a first linear part and a second linear part arranged in different slots and a bridge part positioned outside the stator core to connect the first linear part and the second linear part together, the coil segment formed of a rectangular conductor. Given that a direction of the central axis line is an axial direction, a direction orthogonal to the central axis line is a radial direction, and a direction about the central axis line is a circumferential direction, a plurality of first linear parts or second linear parts are aligned in the radial direction in the slot, and at least an innermost coil segment in the slot is structured with a plurality of divided segments adhered together, each divided segment including a first linear part and a second linear part, and a bridge part positioned outside the stator core to connect the first linear part and the second linear part together, and formed of a rectangular conductor cross-sectional area of which is smaller than the rectangular conductor. The bridge parts of the divided segments are arranged to cross each other in the radial direction, and the first linear parts of the divided segments are, in the slot, aligned in a first direction of the radial direction and the second linear parts are, in the slot, aligned in an opposite direction of the first direction.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

First, an example of a rotary electric machine to which a stator of an embodiment is applied will be described.

Figure 2:
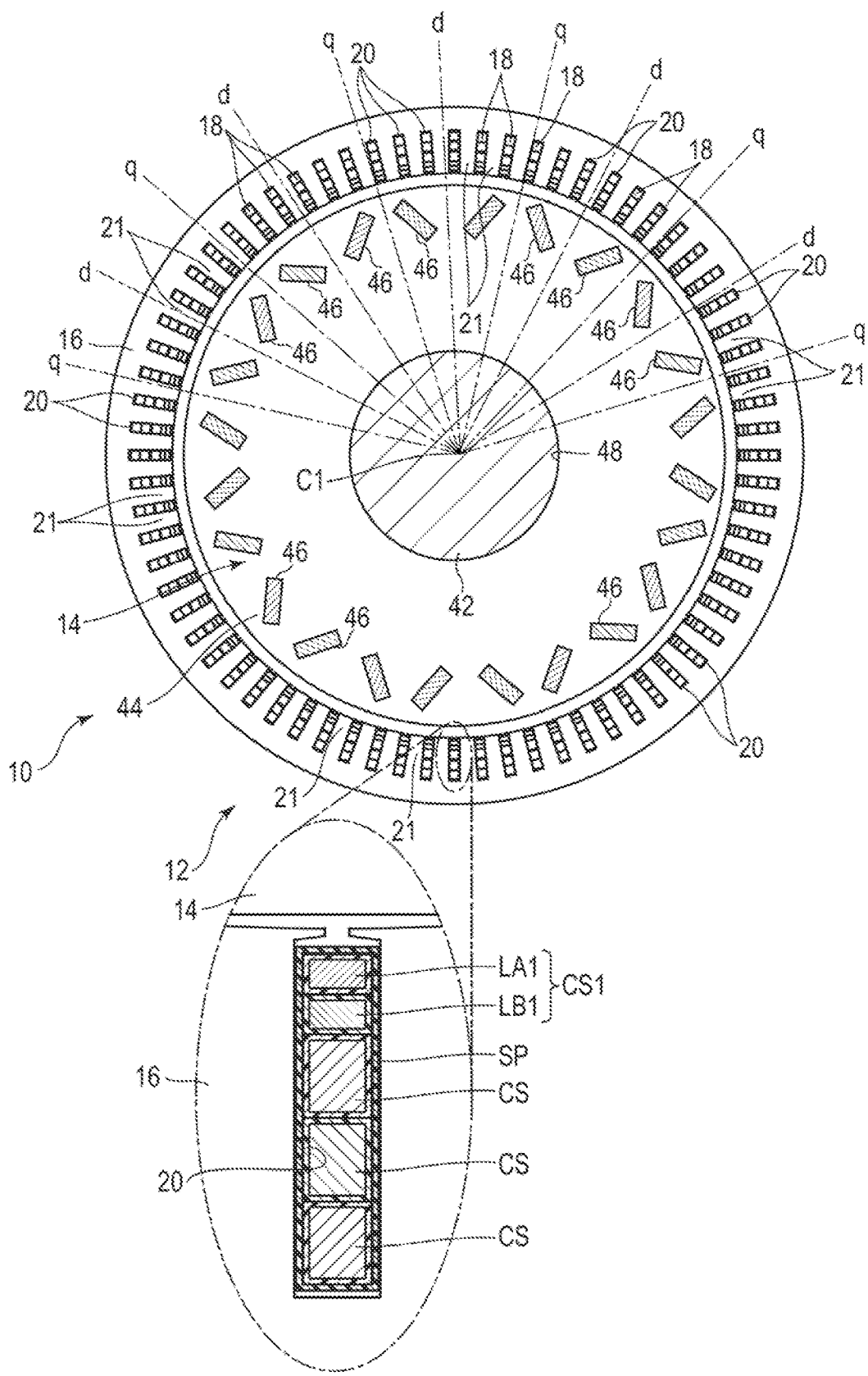
FIG. 2 is a horizontal cross-sectional view of the rotary electric machine of the first embodiment.

FIG. 1 is a vertical cross-sectional view of a rotary electric machine of the first embodiment, showing only one half centered on the central axis line C1. FIG. 2 is a horizontal cross-sectional view of the rotary electric machine.

As in FIG. 1, the rotary electric machine 10 is configured as, for example, a permanent magnet rotary electric machine. The rotary electric machine 10 includes an annular or cylindrical stator 12, rotor 14 supported rotatably about the central axis line C1 inside the stator 12 and coaxially with the stator 12, and casing supporting the stator 12 and the rotor 14.

In the following explanation, a direction of extending part of the central axis line C1 will be referred to as axial direction, direction of rotation around the central axis line C1 as circumferential direction, and direction orthogonal to the axial and circumferential directions as radial direction.

As in FIGS. 1 and 2, the stator 12 includes a cylindrical stator core 16 and a rotor line (segment coil) 18 attached to the stator core 16. The stator core is formed of a number of circular electromagnetic steel sheets 17 of a magnetic material such as silicon steel, stacked in a concentric manner. The multiple sheets 17 are connected to each other in a stacked state by welding at multiple locations on the outer circumference of the stator core 16. The stator core 16 has a first end surface 16a located at one end in the axial direction and a second end surface 16b located in the other end in the axial direction. The first end surface 16a and the second end surface 16b extend to be orthogonal to the central axis line C1.

A plurality (for example, 72) of slots 20 are formed on the inner periphery of the stator core 16. In the present embodiment, the slots 20 are aligned in the circumferential direction at regular intervals. The interval between the slots 20 in the circumferential direction may be set to be irregular. Each slot 20 is open to the inner circumferential surface of the stator core 16 and extends in the radial direction of the stator core from the inner circumferential surface thereof to the outer circumferential surface thereof. Each slot 20 extends over the entire axial length of stator core 16. One end of each slot 20 is open to the first end surface 16a and the other end is open to the second end surface 16b. The slots 20 may be configured not to be open to the inner surface of the stator core 16. That is, the slot 20 may be formed as a through hole that passes along the axial direction in the stator core 16.

By forming a plurality of slots 20, the inner periphery of the stator core 16 structures a plurality (for example, 72 in the present embodiment) of teeth 21 protruding toward the central axis line C1. The teeth 21 are arranged at regular intervals along the circumferential direction. Thus, the stator core 16 integrally includes a circular yoke part and a plurality of teeth 21 protruding radially from the inner surface of the yoke part toward the central axis line C1. A slot 20 is formed between a pair of teeth 21 adjacent to each other in the circumferential direction.

A coil 18 is embedded in a plurality of slots 20 and wound around each of the teeth 21. The coil 18 are formed to include coil ends 18a and 18b extending axially outward from the first end surface 16a and the second end surface 16b of the stator core 16. By applying an alternating current to the coil 18, a predetermined chain flux is formed in the stator 12 (teeth 21).

As in FIG. 1, the stator core 16 has core holders 26 at both ends in the axial direction.

The casing 30 has a substantially cylindrical first bracket 32a and a bowl-shaped second bracket 32b. The first bracket 32a is connected to the core holder 26 located on the drive end side of the stator core 16. The second bracket 32b is connected to the core holder 26 located on the anti-drive end side. The first and second brackets 32a and 32b are formed of, for example, aluminum alloy and the like. An annular bearing bracket 34 is bolted coaxially to the end side of the first bracket 32a. A first bearing part 36 incorporating a roller bearing 35 is fastened to the center of the bearing bracket 34, for example. A second bearing part 38 incorporating a ball bearing 37 is fastened to the center of the second bracket 32b, for example.

On the other hand, the rotor 14 has a cylindrical shaft (rotary axis) 42 which is rotatably supported about the central axis line C1 by the first and second bearing parts 36 and 38, cylindrical rotor core 44 fixed to substantially the center of the shaft 42 in the axial direction, and a plurality of permanent magnets 46 embedded in the rotor core 44. The rotor core 44 is structured as a lamination body in which a number circularly shaped electromagnetic steel sheets 47 of magnetic materials such as silicon steel are laminated in a concentric manner. The rotor core 44 includes an inner hole 48 formed coaxially with the central axis line C1. The shaft 42 is inserted and fitted into the inner hole 48 and extends coaxially with the rotor core 44. An abbreviated disc-shaped end plate 54 and a core holder 56 are provided at both ends of the rotor core 44 in the axial direction.

As in FIGS. 1 and 2, the rotor core 44 is coaxially positioned inside the stator core 16 with a small gap (air gap) therebetween. In other words, the outer peripheral surface of the rotor core 44 is opposed to the inner peripheral surface of the stator core 16 (the leading edge of the teeth 21) with a small air gap therebetween.

The rotor core 44 has a plurality of magnet embedded holes penetrating in the axial direction. A permanent magnet 46 is loaded and arranged in each magnet embedded hole and secured to the rotor core 44 by, for example, an adhesive. Each permanent magnet 46 extends over the entire length of the rotor core 44. The permanent magnets 46 are arranged at predetermined intervals in the circumferential direction of the rotor core 44.

As in FIG. 2, the rotor core 44 has a d-axis extending radially or in radial direction of the rotor core 44, and a q-axis which is electrically separated from the d-axis by 90°. In this example, the q-axis is the axis extending radially through the boundary between adjacent poles and the central axis line C1, and the d-axis is the direction electrically perpendicular to the q-axis. The d-axis and q-axis are provided alternately in the circumferential direction of the rotor core 44 and in predetermined phases.

In the circumferential direction of the rotor core 44, two permanent magnets 46 are arranged on both sides of each d-axis. In the present embodiment, each of the permanent magnets 46 is an elongated, rectangular-shaped, and elongated magnet, and has a length approximately equal to the axial length of the rotor core 44. Viewing in a horizontal cross-section of the rotor core 44 orthogonal to the central axis line C1, the permanent magnets 46 are each inclined to the d-axis. The two permanent magnets 46 are arranged side by side in an approximately V-shaped arrangement, for example. Here, the inner ends of the permanent magnets 46 are each adjacent to the d-axis and face each other with a slight gap therebetween. The outer peripheral ends of the permanent magnets 46 are spaced apart from the d-axis along the circumferential direction of the rotor core 44 and are located near the outer surface of the rotor core 44 and near the q-axis. As a result, the outer circumferential ends of the permanent magnets 46 are adjacent and opposite to the outer peripheral ends of the permanent magnets 46 of the adjacent poles, across the q-axis. In the present embodiment, the rotor core 44 includes 12 magnetic poles aligned in the circumferential direction, and each pole contains two permanent magnets 46.

The shape of the permanent magnet 46 is not limited to an elongated flat plate with a rectangular cross section, but various shapes can be used.

Next, the configuration of the stator 12 will be described.

Figure 3:
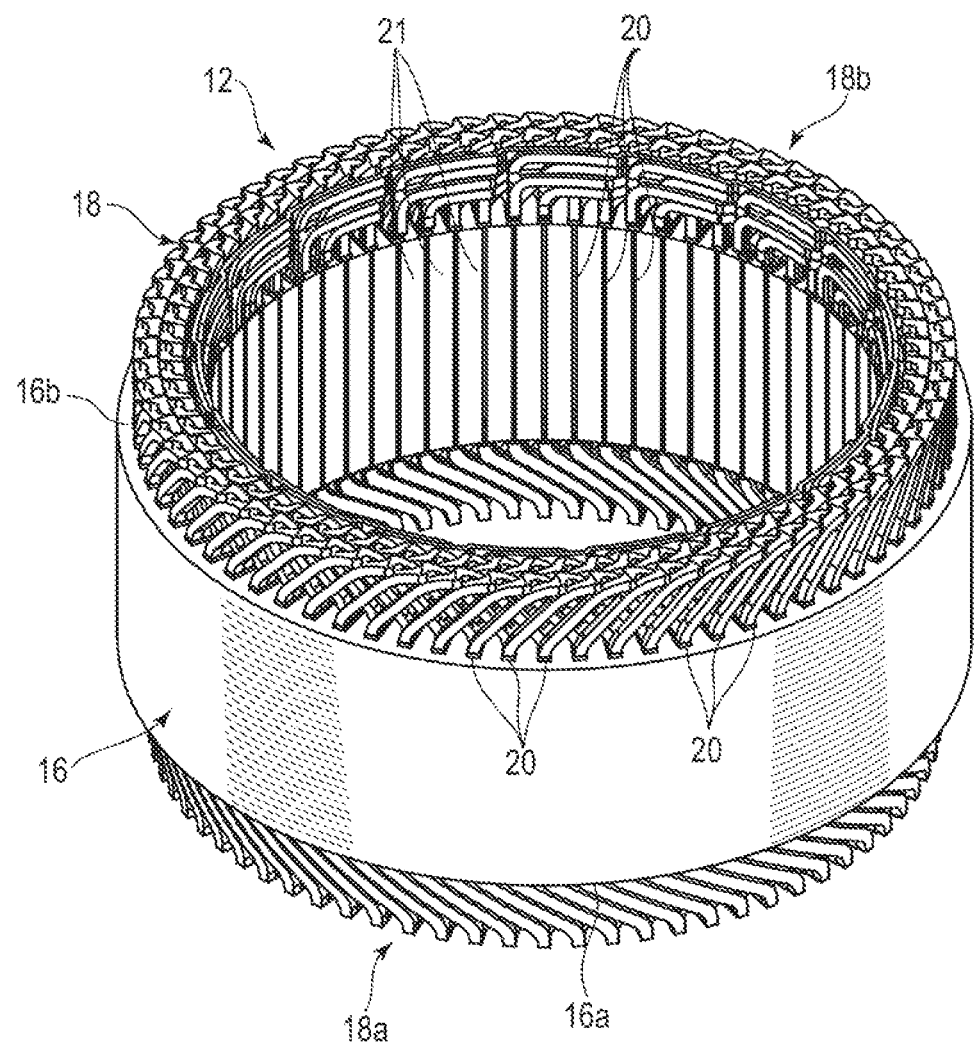
FIG. 3 is a perspective view illustrating a first end surface side of the stator, in a partially enlarged manner.
Figure 4:
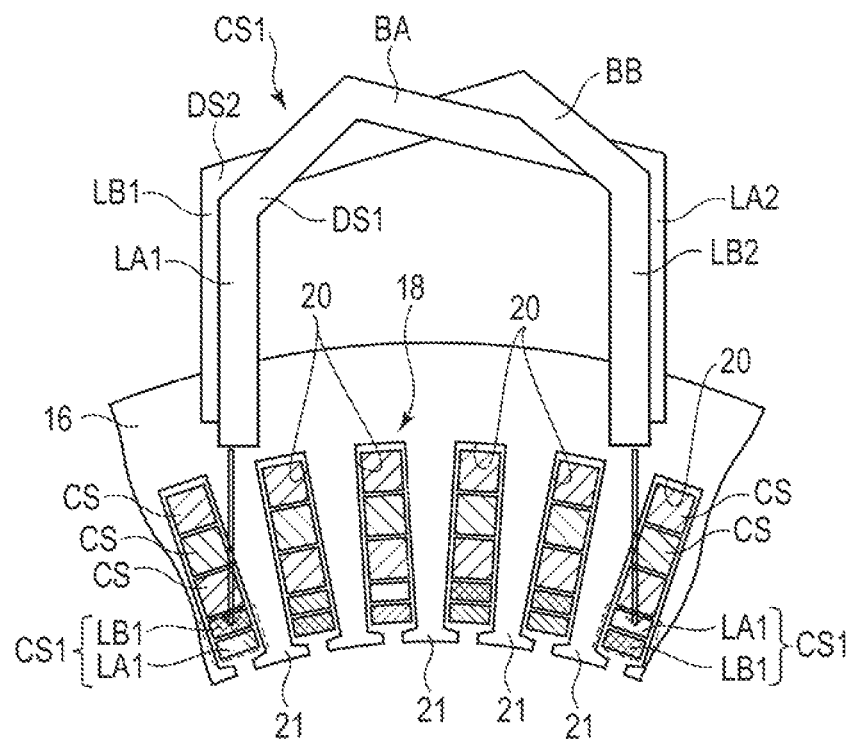
FIG. 4 is a schematic view of a part of a cross-section of the stator and divided segments.

FIG. 3 illustrates the first end surface side of the stator, and FIG. 4 schematically illustrates a portion of the cross section of the stator and divided segments.

As in FIG. 3, the stator 12 is driven by a 3-phase (U-phase, V-phase, and W-phase) AC power supply. For example, coils 18 connected in parallel corresponding to phase U, coils 18 connected in parallel corresponding to phase V, and coils 18 connected in parallel corresponding to phase W are wound around the teeth 21 in a distributed arrangement. That is, a total of six coils 18 corresponding to phases U, V, and W, connected in parallel, respectively, are wound around the teeth 21. As described below, the coils 18 include three phases (U, V, and W) for each pole, and each phase coil is arranged in two of the six slots corresponding to one pole. In each phase of stator 12, the coils are not limited to those connected in parallel, but can also be connected in series.

Each coil 18 is structured with a segment coil formed by joining multiple coil segments formed of rectangular conductor to each other to form a single coil. The rectangular conductor has a cross-section perpendicular to the longitudinal direction (horizontal cross-section) which is a substantially rectangular shape, or the shape of the cross-section perpendicular to the longitudinal direction including at least two opposite long sides. When the horizontal cross-section of a rectangular conductor is rectangular, the four corners need not be right-angled and may be chamfered or radiused. The rectangular conductor is almost entirely covered with an insulating layer such as enamel, except for the conductive part at the tip.

As described below, each coil segment includes a first linear part and a second linear part, which are inserted and placed in different slots 20, and a bridge part connecting the first linear part and the second linear part, which is located outside the stator core 16 to be opposed to the second end surface 16b. A plurality of bridge parts structure a coil end 18b. The first linear part and the second linear part each have an extending end extending outward from the first end surface 16a of the stator core 16. The extending ends are bent in the circumferential direction and structure the coil end 18a of the coil 18.

As in FIGS. 2 and 4, multiple, for example, four first linear parts or second linear parts are arranged in each slot 20 in the radial direction of the slot 20 with one side of the rectangle facing each other. Within the slot 20, an insulating sheet SP is wound around the four linear parts. Of four coil segments CS, at least one thereof is divided into a plurality of coil segments and multi-rowed. In the present embodiment, the coil segment CS1 located on the innermost side of the slot 20 includes, for example, two divided segments DS1 and DS2. The divided segments DS1 and DS2 are formed of a rectangular conductor with a cross-sectional area that is about half the cross-sectional area of the other coil segment CS, that is, a rectangular conductor that is thinner than the other coil segment CS.

As in FIG. 4, the divided segment DS1 integrally includes a first linear part LA1 and a second linear part LA2, and a bridge part BA located to be opposed to the second end surface 16b outside the stator core 16 and connecting the first linear part LA1 and the second linear part LA2. Similarly, the divided segment DS2 integrally includes a first linear part LB1 and second linear part LB2, and a bridge part BB located to be opposed to the second end surface 16b outside the stator core 16 and connecting the first linear part LB1 and the second linear part LB2.

The pair of first linear parts LA1 and LB1 are arranged in the slot 20 to be adjacent to each other in a first direction of the radial direction. For example, the first linear part LA1 is located on the innermost side of slot 20, and the first linear part LB1 is adjacent to the first linear part LA1 in the outside of the radial direction. The second linear parts LA2 and LB2 are located in, for example, a slot 20 five slots away from first linear parts LA1 and LB1, and adjacent to each other. Here, the bridge part BA and bridge part BB are arranged in the radial direction of stator core 16, intersecting each other. This means that the arrangement of the second linear parts LA2 and LB2 is reversed from that of the first linear parts LA1 and LB2. That is, the second linear parts LA2 and LB2 are arranged in the opposite direction to the first direction, and the second linear part LB2 is placed on the innermost side of the slot 20, and the second linear part LA2 is placed adjacent to the second linear part LB2 in the outside of the radial direction.

Note that, the number of slots where the second linear parts LA2 and LB2 are separated from the first linear parts LA1 and LB1 is not limited to five, and can take various values depending on the electrical design of the stator.

Figure 5:
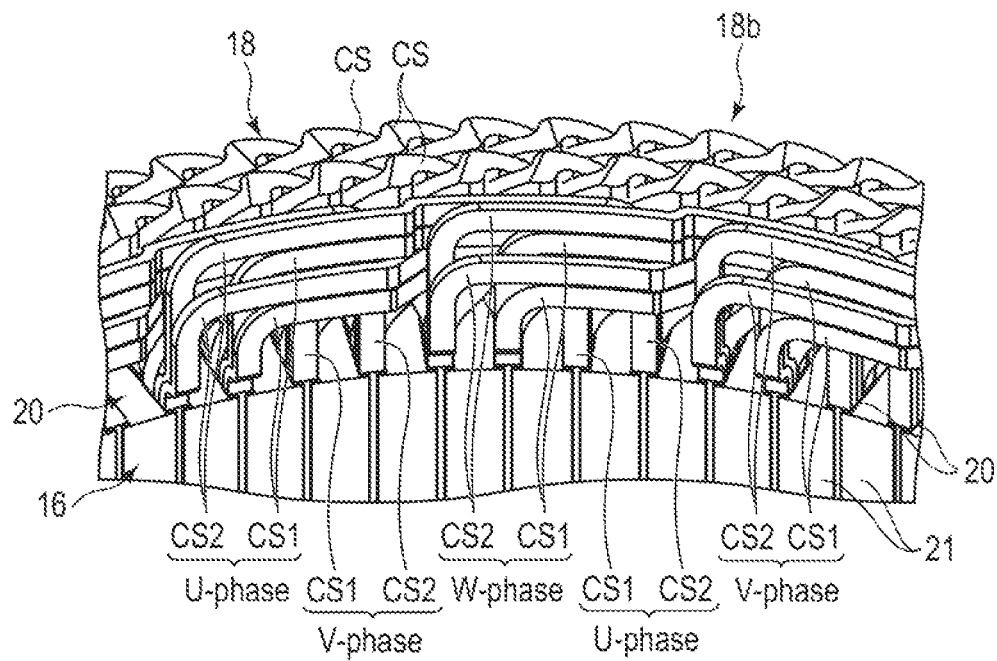
FIG. 5 is a perspective view illustrating the first end surface side of the stator, in a partially enlarged manner.
Figure 6:
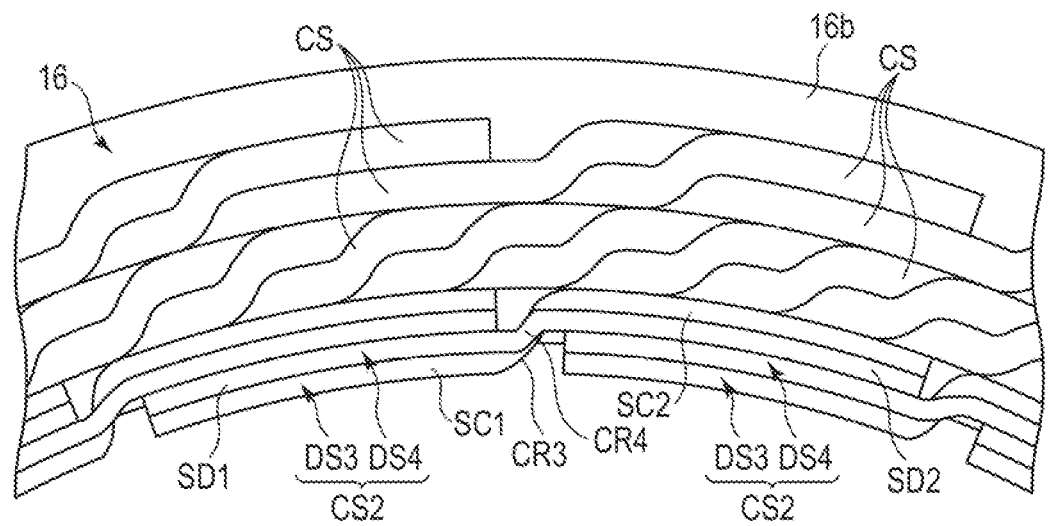
FIG. 6 is a plan view illustrating a part of the first end surface side of the stator.

FIG. 5 is an enlarged view of a portion of the first end surface side of the stator, and FIG. 6 is a plan view of a portion of the first end surface side of the stator.

As in FIGS. 5 and 6, a one-phase segment coil 18 includes a first coil segment CS1 located in the innermost side of slot 20 and a second coil segment CS1 located in the innermost side of the slot 20 so as to sandwich the first coil segment CS1 from both sides in the circumferential direction. The first coil segment CS1 and the second coil segment CS2 are each multi-rowed and each includes two divided segments.

In one example, the first and second coil segments CS1 and CS2 of U-phase are placed side by side in two slots 20 adjacent to each other in the circumferential direction, and the first and second coil segments CS1 and CS2 of V-phase are placed in the two slots 20 adjacent to the above slots 20. Furthermore, the first and second coil segments CS1 and CS2 of W-phase are placed side by side in two slots 20 circumferentially adjacent to the two slots 20 in which the first and second coil segments CS1 and CS2 are arranged. As above, in the innermost side of slot 20, two U-phase coil segments, two V-phase coil segments, and two W-phase coil segments are arranged side by side in order in the circumferential direction.

Figure 7:
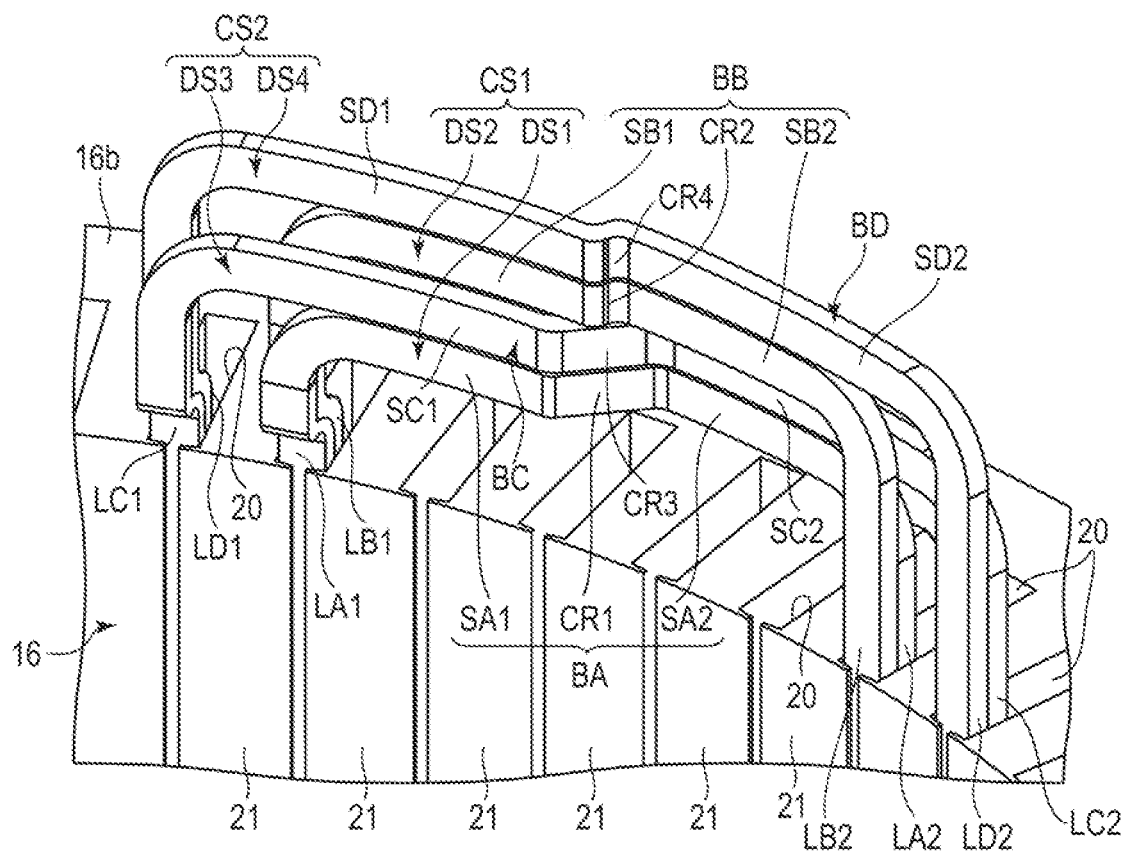
FIG. 7 is a perspective view illustrating a part of the first end surface side of the stator and multi-row inner peripheral side segment coils.

FIG. 7 is a perspective view illustrating an arrangement structure of a first coil segment CS1 and a second coil segment CS2 of one phase.

As in the figure, the first coil segment CS1 includes divided segments (first divided segment and second divided segment) DS1 and DS2. The divided segment DS1 integrally includes the first linear part LA1 and the second linear part LA2, a bridge part BA positioned to be opposed to the second end surface 16b outside the stator core 16 and connecting the first linear part LA1 and second linear part LA2. Similarly, the divided segment DS2 integrally includes the first linear part LB1 and the second linear part LB2, and a bridge part BB positioned to be opposed to the second end surface 16b outside the stator core 16 and connecting the first linear part LB1 and the second linear part LB2.

A pair of first linear parts LA1 and LB1 of the first coil segment CS1 are arranged in the slot 20 and adjacent to each other in the radial direction. For example, the first linear part LA1 is located in the innermost side of the slot 20, and first linear part LB1 is adjacent to the first linear part LA1 in the outside of the radial direction. In the first linear parts LA1 and LB1, an extending end projecting from the second end surface 16b of the stator core 16 is bent inwardly the radial direction of the stator core 16 and further bent in the axial direction. Thus, the extending ends of the first linear parts LA1 and LB1 are shifted inward of the radial direction than is the inner peripheral side end of the slot 20, that is, than the inner periphery of the stator core 16.

The bridge part BA of the divided segment DS1 includes a first section SA1 extending from the extending end of the first linear part LA1 along the circumferential direction of the stator core 16, first crank part CR1 extending from the terminal end of the first section SA1 sloping radially outward and substantially parallel to the second end surface 16b, and second section SA2 extending from the terminal end of the first crank part CR1 to the extending end of the second linear part LA2 along the circumferential direction and substantially parallel to the second end surface 16b. The first crank part CR1 is positioned approximately middle between the first linear part LA1 and the second linear part LA2. The bridge part BA is formed of a rectangular conductor which is bent in a thickness direction or a direction orthogonal to the thickness direction without twisting the rectangular conductor. For example, the second linear part LA2 is located in the slot 20 which is five slots away from first linear part LA1.

The bridge part BA of divided segment DS1 is a part connecting the divided segment DS1 housed in the slot 20 with different circumferential direction positions of the stator core 16, and thus, the first section SA1 and the second section SA2 are not necessarily parallel (or substantially parallel) to the second end surface 16b of the stator core 16, and can be made in various shapes.

The bridge part BA of divided segment DS1 is opposed to the second end surface 16b with a space therebetween. The first section SA1 is located inwardly shifted from the inner edge of the stator core 16. By providing the first crank part CR1, the second section SA2 is shifted radially outward from the first section SA1 by about three times the thickness of the divided segment DS1. This means that the second linear part LA2 is arranged in the slot 20 to be shifted radially outward from the first linear part LA1 by the thickness thereof.

The bridge part BB of the divided segment DS2 includes a first section SB1 extending from the extending end of the first linear part LB1 along the circumferential direction of the stator core 16, second crank part CR2 extending from the terminal end of the first section SB1 sloping radially outward and substantially parallel to the second end surface 16b, and second section SB2 extending from the terminal end of the second crank part CR2 to the extending end of the second linear part LB2 along the circumferential direction and substantially parallel to the second end surface 16b. The second crank part CR2 is positioned approximately middle between the first linear part LB1 and the second linear part LB2. The bridge part BB is formed of a rectangular conductor which is bent in a thickness direction or a direction orthogonal to the thickness direction without twisting the rectangular conductor. For example, the second linear part LB2 is located in the slot 20 which is five slots away from first linear part LB1.

Note that, the bridge part BB of the divided segment DS2 is a part connecting the divided segment DS2 housed in the slot 20 with different circumferential direction positions of the stator core 16, and thus, the first section SB1 and the second section SB2 are not necessarily parallel (or substantially parallel) to the second end surface 16b of the stator core 16, and can be made in various shapes.

The first linear part LB1 and the second linear part LB2 are almost twice as wide as the width of the rectangular conductor than the first and second linear parts LA1 and LA2 of the divided segment DS1 and extend axially from the stator core 16. As a result, the bridge part BB is substantially parallel to the second end surface 16b with a larger spacing than the bridge part BA and is opposed to the second end surface 16b. The first section SB1 is located to be shifted inwardly from the inner edge of the slot 20 and approximately over the inner edge of the stator core 16. Furthermore, the first section SB1 is located to be shifted radially outward from the first section SA1 of the divided segment DS1 by the thickness of the rectangular conductor, and is located to be shifted upward (away from the second end surface 16b) by the width of the rectangular conductor. The second crank part CR2 overlaps above the first crank part CR1 in the axial direction, and extends to cross the first crank part CR1. The extending part length (height in the radial direction) (second length) of the second crank part CR2 along the longitudinal direction of the rectangular conductor is less than half the extending part length (first length) of the first crank part CR1. As a result, the second section SB2 is positioned radially inward from the second section SA2 by the thickness of the rectangular conductor, and is also positioned axially upward (away from the second end surface 16b) by the width of the rectangular conductor. The second linear part LB2 is located radially inward from the first linear part LB1 and is positioned on the innermost side in the slot 20.

As above, the bridge part BA of the divided segment DS1 and the bridge part BB of the divided segment DS2 extend to intersect in the radial direction, and the positional relationship of the first linear parts LA1 and LB1 is reversed from that of the second linear parts LA2 and LB2. That is, the first linear part LA1 is located inside of first linear part LB1 in the radial direction, and the second linear part LA2 is located outside of the second linear part LB2 in the radial direction.

The second coil segment CS2 positioned so as to sandwich the first coil segment CS1 from both sides in the circumferential direction includes divided segments (third and fourth divided segments) DS3 and DS4. The divided segment DS3 integrally includes a first linear part LC1 and a second linear part LC2, and a bridge part BC positioned to be opposed to the second end surface 16b outside the stator core 16 and connecting the first linear part LC1 and second linear part LC2. Similarly, the divided segment DS4 integrally includes a first linear part LD1 and a second linear part LD2, and a bridge part BD positioned to be opposed to the second end surface 16b outside the stator core 16 and connecting the first linear part LD1 and second linear part LD2.

A pair of first linear parts LC1 and LD1 of the second coil segment CS2 are arranged in the slot 20 which is adjacent by one (outward in the circumferential direction) to the slot 20 in which the first linear parts LA1 and LB1 of the first coil segment CS1 are arranged, and are adjacent to each other in a first direction of the radial direction. For example, the first linear part LC1 is located in the innermost side of the slot 20, and first linear part LD1 is adjacent to the first linear part LC1 in the outside of the radial direction. In the first linear parts LC1 and LD1, an extending end projecting from the second end surface 16b of the stator core 16 is bent inwardly the radial direction of the stator core 16 and further bent in the axial direction. Thus, the extending ends of the first linear parts LC1 and LD1 are shifted inward of the radial direction than is the inner peripheral side end of the slot 20, that is, than the inner periphery of the stator core 16.

The bridge part BC of the divided segment DS3 includes a first section SC1 extending from the extending end of the first linear part LC1 along the circumferential direction of the stator core 16 and substantially parallel to the second end surface 16b, first crank part (third crank part) CR3 extending from the terminal end of the first section SC1 sloping radially outward and substantially parallel to the second end surface 16b, and second section SC2 extending from the terminal end of the first crank part CR3 to the extending end of the second linear part LA2 along the circumferential direction and substantially parallel to the second end surface 16b. The first crank part CR3 is positioned approximately middle between the first linear part LC1 and the second linear part LC2. The bridge part BC is formed of a rectangular conductor which is bent in a thickness direction or a direction orthogonal to the thickness direction without twisting the rectangular conductor. For example, the second linear part LC2 is located in the slot 20 which is seven slots away from first linear part LC1, that is, in the slot 20 adjacent by one (outeard in the circumferential direction) to the slot 20 in which the second linear parts LA2 and LB2 of the first coil segment CS1 are arranged. Note that, the number of slots where the second linear part LC2 is separated from the first linear part LC1 is not limited to seven, and can take various values depending on the electrical design of the stator.

The first linear part LC1 and the second linear part LC2 is almost as wide as the width of the rectangular conductor than the first and second linear parts LA1 and LA2 of the divided segment DS1 and extend axially from the stator core 16. This allows the bridge part BC to face the second end surface 16b with a larger spacing than the bridge part BA.

Note that, the bridge part BC of the divided segment DS3 is a part connecting the divided segment DS3 housed in the slot 20 with different circumferential direction positions of the stator core 16, and thus, the first section SC1 and the second section SC2 are not necessarily parallel (or substantially parallel) to the second end surface 16b of the stator core 16, and can be made in various shapes.

The first section SC1 of the bridge part BC is shifted in the inner peripheral side than the inner edge of the stator core 16. By providing the first crank part CR3, the second section SC2 is shifted outward in the radial direction by approximately three times the thickness of the divided segment DS3. Thus, the second linear part LC2 is displaced radially outward from the first linear part LC1 by about one thickness. The first section SC1, first crank part CR3, and second section SC2 of divided segment DS1 are disposed to overlap the first section SA1, first crank part CR1, and second section SA2 of the divided segment DS1, respectively, in the axial direction.

The bridge part BD of the divided segment DS4 includes a first section SD1 extending from the extending end of the first linear part LD1 along the circumferential direction of the stator core 16 and substantially parallel to the second end surface 16b, second crank part (fourth crank part) CR4 extending from the terminal end of the first section SD1 sloping radially outward and substantially parallel to the second end surface 16b, and second section SD2 extending from the terminal end of the second crank part CR4 to the extending end of the second linear part LD2 along the circumferential direction and substantially parallel to the second end surface 16b. The second crank part CR4 is positioned approximately middle between the first linear part LD1 and the second linear part LD2. The bridge part BD is formed of a rectangular conductor which is bent in a thickness direction or a direction orthogonal to the thickness direction without twisting the rectangular conductor. For example, the second linear part LD2 is located in the slot 20 which is seven slots away from first linear part LD1.

Note that, the number of slots where the second linear part LD2 is separated from the first linear part LD1 is not limited to seven, and can take various values depending on the electrical design of the stator. Furthermore, the bridge part BD of the divided segment DS4 is a part connecting the divided segment DS4 housed in the slot 20 with different circumferential direction positions of the stator core 16, and thus, the first section SD1 and the second section SD2 are not necessarily parallel (or substantially parallel) to the second end surface 16b of the stator core 16, and can be made in various shapes.

The first linear part LD1 and the second linear part LB2 are almost twice as wide as the width of the rectangular conductor than the first and second linear parts LC1 and LC2 of the divided segment DS3 and extend axially from the stator core 16. As a result, the bridge part BD is substantially parallel to the second end surface 16b with a larger spacing than the bridge part BC and is opposed to the second end surface 16b. The first section SD1 is located to be shifted inwardly from the inner edge of the slot 20 and approximately over the inner edge of the stator core 16. Furthermore, the first section SD1 is located to be shifted radially outward from the first section SC1 of the divided segment DS3 by the thickness of the rectangular conductor, and is located to be shifted upward (away from the second end surface 16b) by the width of the rectangular conductor. The second crank part CR4 overlaps above the first crank part CR3 in the axial direction, and extends to cross the first crank part CR3. The extending part length (height in the radial direction) of the second crank part CR4 along the longitudinal direction of the rectangular conductor is less than half the extending part length of the first crank part CR3. As a result, the second section SD2 is positioned radially inward from the second section SC2 of the divided segment DS3 by the thickness of the rectangular conductor, and is also shifted to be axially upward (away from the second end surface 16b) by the width of the rectangular conductor. Thus, the second linear art LD2 is positioned radially inward with respect to the first linear part LC1 and in the innermost side in the slot 20. The first section SC1, second crank part CR4, and second section SD2 of bridge part BD are disposed to overlap the first section SB1, second crank part CR2, and second section SB2 of the divided segment DS2, respectively, in the axial direction.

As above, the bridge part BC of the divided segment DS3 and the bridge part BD of the divided segment DS4 extend to intersect in the radial direction, and the positional relationship of the first linear parts LC1 and LD1 is reversed from that of the second linear parts LC2 and LD2. That is, the first linear part LC1 is located inside of first linear part LD1 in the radial direction, and the second linear part LC2 is located outside of the second linear part LD2 in the radial direction. The second linear parts LC2 and LD2 are aligned in the opposite direction of the first direction.

Figure 8:
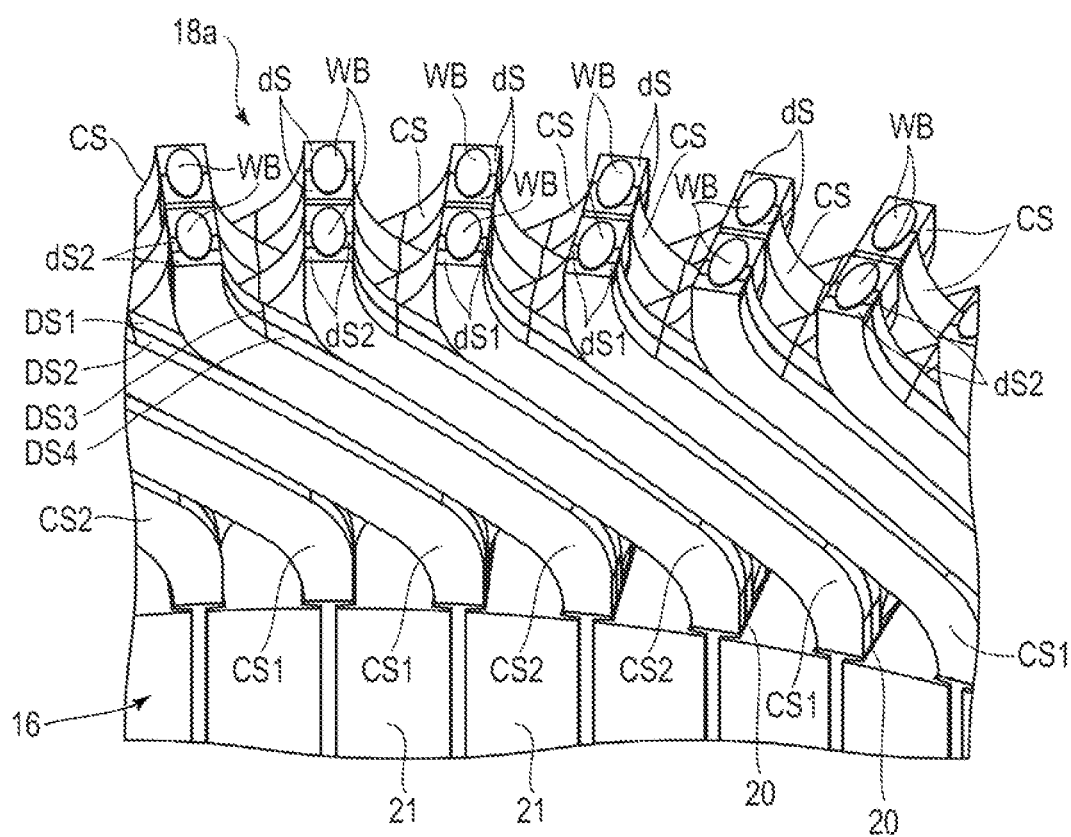
FIG. 8 is a perspective view illustrating a part of a second end surface side of the stator.
Figure 9:
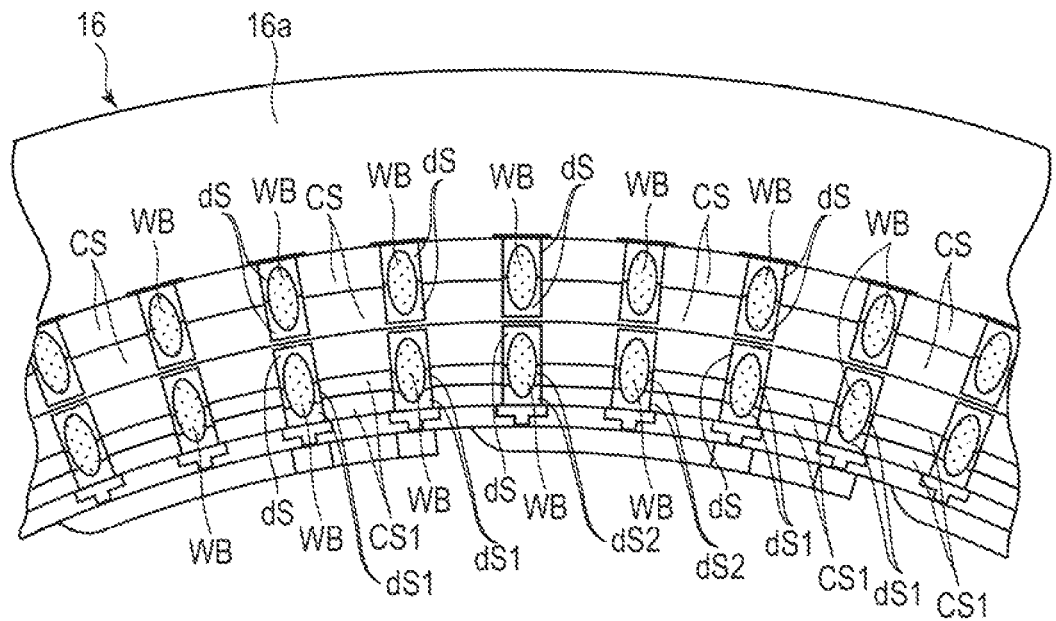
FIG. 9 is a plan view illustrating a part of the second end surface side of the stator.

FIG. 8 is a perspective view illustrating a part of the first end surface side of the stator, and FIG. 9 is a plan view illustrating a part of the first end surface side of the stator.

As in the figure, on the side of the first end surface 16a of the stator core 16, the first linear part and second linear part of the coil segment CS include extending parts extending from the first end surface 16a to the outside of the stator core 16. These extending parts are bent at a predetermined angle in a circumferential direction and extend at an angle to the axial direction, respectively. Similarly, the first linear part and second linear parts of divided segments DS1 to DS4 include extending parts extending outward from the first end surface 16a to the outside of the stator core 16, respectively. The extending parts are each bent at a predetermined angle in a circumferential direction and extend at an angle to the axial direction. The extending end of each of the extending parts includes an end surface (junction surface) ds approximately parallel to the first end surface 16a.

The extending parts of the four first or second linear parts inserted into each slot 20 are alternately bent in one and opposite directions. That is, the extending part of the first or second linear part of the outermost coil segment CS is bent in one direction in the circumferential direction of the stator core 16, and the extending part of the first or second linear part of one inner coil segment CS is bent in one direction of the circumferential direction of the stator core 16, and the extending part of the first or second linear part of one inner coil segment CS is bent in the other direction of the circumferential direction (in the opposite direction). Furthermore, the linear part of the first or second linear part of one inner coil segment CS is bent in the aforementioned one direction. Furthermore, the extending parts of the first or second linear part of the innermost divided segments CS1 and CS2 are bent in the other direction described above.

The end surfaces ds of the four extending parts extending from a plurality of different slots 20 are located almost in a row and flushed along the radial direction of the stator core 16. Of the four extending parts, each of the extending parts of the innermost coil segments CS1 and CS2 has two end surfaces ds1 and ds2 of the two divided segments.

The end surfaces ds of the four extending parts in each row are welded to each other two by two (two set) and electrically conductive. That is, the end surfaces ds of the two extending sections on the outer peripheral side are welded to each other, and a weld bead WB across the two end surfaces ds is formed. The end surfaces ds of the two extending parts on the inner peripheral side are welded to each other to form the weld bead WB. In this case, the two end surfaces ds1 (or ds2) of the two divided segments are welded to each other, and the divided segments are electrically connected to each other, and furthermore, the two end surfaces ds1 (or ds2) are simultaneously joined to the end surfaces ds of the extending parts of the adjacent coil segment CS. As a result, the weld bead WB is formed across in three end surfaces ds, ds1, ds1 (or three end surfaces ds, ds2, ds2). For example, laser welding can be used to weld the end surfaces ds of the extending part. Each weld or joint of the coil segment is covered with an insulating material such as powder coating, varnish, etc.

By connecting the extending ends of the coil segments as described above, a three-phase segment coil 18 is structured. The extending parts of these coil segments form a coil end 18a protruding from the first end surface 16a. To three of the coils 18, U-phase connection terminal TU, V-phase connection terminal TU, V-phase connection terminal TV, and W-phase connection terminal TW, which are not shown, are connected, respectively. In the present embodiment, a case where the number of coils in parallel of the stator 12 is two, and the connection terminals 8 are provided respectively according to the number of coils in parallel.

As described above, the present embodiment illustrates the structure with a 3-phase, 12-pole, 72-slot rotary electric machine, furthermore, the number of slots in the stator core 16 corresponding to one magnetic pole is six, and the coils of each phase are arranged in 2 slots for each magnetic pole.

According to the rotary electric machine and the stator thereof of the present embodiment, by configuring the coil 18 with a segment coil, the projection height of the coil ends 18a and 18b protruding from the first and second end surfaces 16a and 16b, respectively, of the stator core 16 can be significantly reduced, and the stator 12 can be downsized. Furthermore, of the three or more segment coils aligned in the radial direction in the slot 20, at least the coil segments CS1 and CS2, which are located at least at the innermost circumference, are multi-rowed and composed of a plurality of divided segments DS1 to DS4, each of which includes a rectangular conductor with a thin wire diameter. By multi-rowing the innermost segment coil, the reduction in slot space utilization due to the increase in the number of conductors can be suppressed, and the effect of loss reduction at low speeds can be maintained. At the same time, by dividing the coil segments in the radial direction, the cross-sectional area of the conductor orthogonal to the magnetic flux crossing the slot 20 in the circumferential direction is reduced, and the eddy currents generated in the conductor during high-speed rotation and the losses resulting therefrom can be reduced.

In a multi-rowed coil segment, the ends of multiple divided segments are welded to each other and electrically joined, and thus, a closed circuit exists between the welding points in a set of multi-rowed coils. If the coil ends do not have a dislocation configuration, circulating currents are induced in the closed circuit, resulting in a new source of increased losses. On the other hand, if, as in the present embodiment, the bridge parts of the two divided segments are crossed and the positional relationship of the first linear part and the positional relationship of the second linear part are shifted, the occurrence of the bove circulating current can be suppressed. Therefore, low loss can be achieved with the multi-row innermost coil without creating a new loss increase factor.

Figure 10:
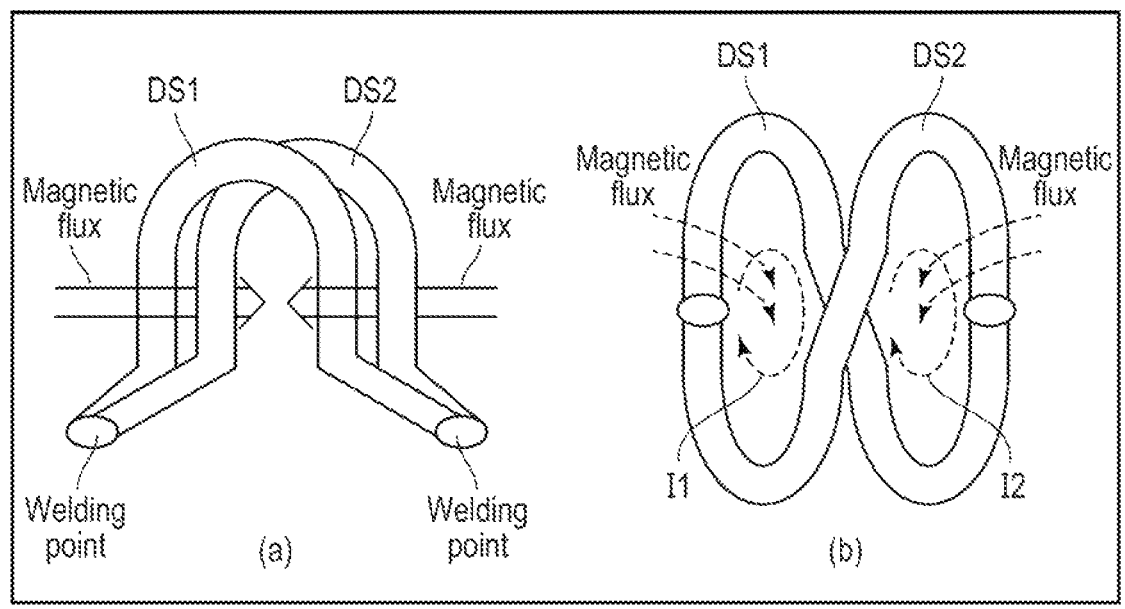
FIG. 10 is a schematic view illustrating a passing state of magnetic flux in multi-row coil segments.

FIG. 10 schematically illustrates the state of magnetic flux passage in a multi-rowed coil segment. As in FIG. 10(a), when the bridge parts of two divided segments DS1 and DS2 are crossed and the welding points at both ends are displaced, the magnetic flux in opposite directions will pass through the loop between each welding point and the crossing position. Therefore, as in FIG. 10(b), the circulating currents I1 and I2 in one loop and the other loop are in opposite directions and act to cancel each other out. Therefore, the generation of circulating currents is suppressed and loss increase can be prevented.

The dislocation configuration that reverses the positional relationship between the two ends is achieved by bending the divided segments DS1 and DS2 in the thickness direction or in the direction perpendicular to the thickness direction without twisting them to lane change the first sections SA1 and SB1 and the second sections SA2 and SB2. Therefore, the manufacturing and assembly of segment coils are easier than in the case of twisting.

Furthermore, according to the present embodiment, in the multi-rowed first coil segment CS1 and second coil segment CS2, the first crank part CR1 and CR3 and the second crank part CR2 and CR4 of the bridge part are located directly above the slots between coil segments of other phases adjacent to each other in the circumferential direction, and can be positioned near the coil segments of other phases without interfering with the coil segments of other phases. Therefore, the coil end 18b can be made smaller and simpler.

Furthermore, in the present embodiment, the first crank parts CR1 and CR3, which have long wire lengths, are placed below the second crank parts CR2 and CR3, which have short wire lengths, in other words, below the stator core 16 side, and thus, the installation and assembly of coil segments can be facilitated.

As can be understood from the above, according to the present embodiment, the stator of rotary electric machine in which the size of the coil end can be reduced while suppressing the generation of eddy currents can be achieved.

Next, the stator of other embodiments will be described. In the other embodiments described below, parts identical to the first embodiment described above will be referred to with the same reference numbers to omit or simplify the detailed descriptions thereof, and the description will focus on parts that differ from the first embodiment.

Second Embodiment

Figure 11:
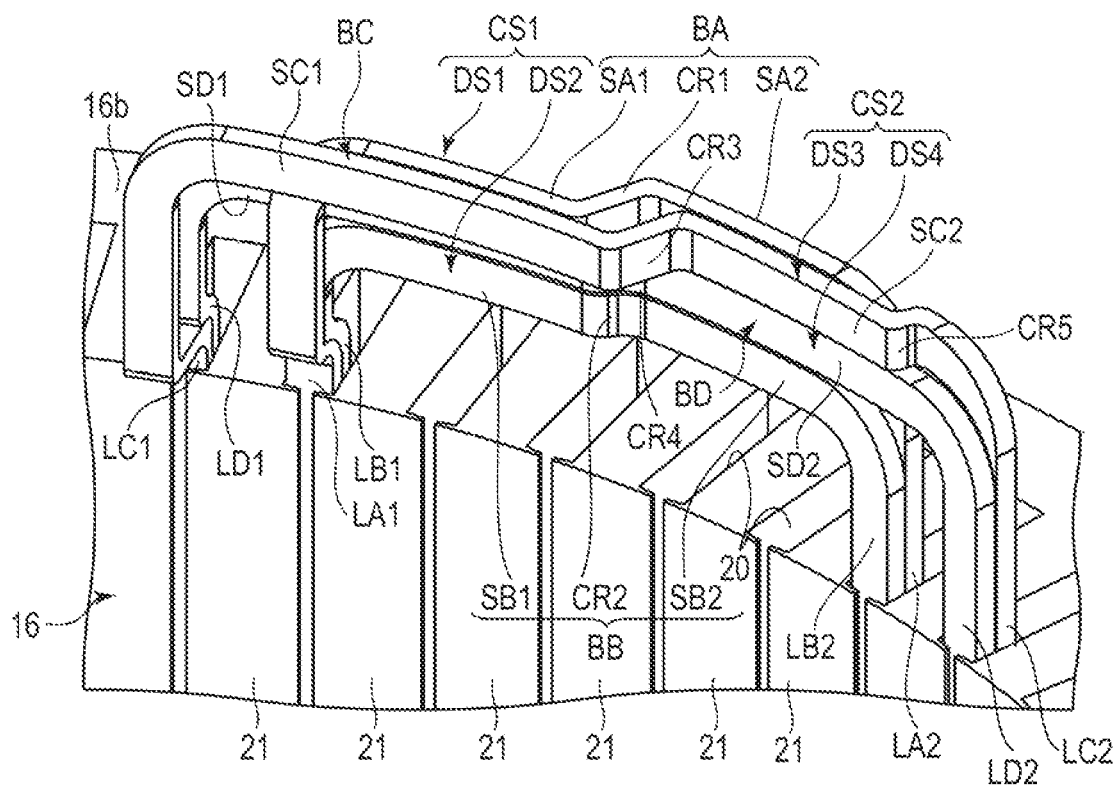
FIG. 11 is a perspective view illustrating a part of a first end surface side of a stator of a second embodiment, and multi-row inner peripheral side segment coils.
Figure 12:
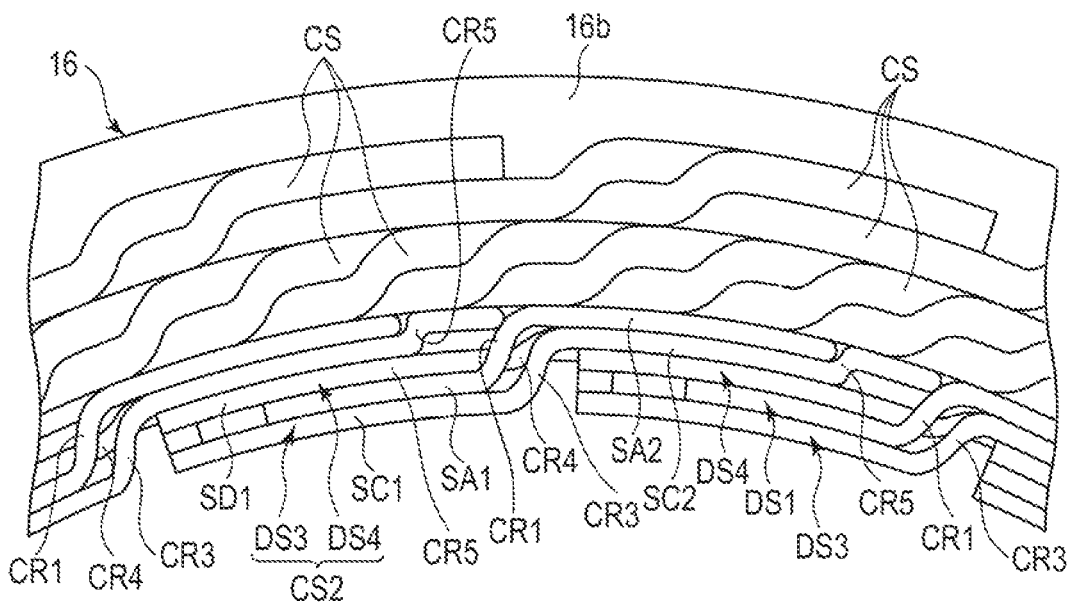
FIG. 12 is a plan view illustrating a part of the first end surface side of the stator of the second embodiment.

FIG. 11 is a perspective view illustrating an arrangement structure of a first coil segment CS1 and a second coil segment CS2 of one phase of a stator of the second embodiment. FIG. 12 is a plan view illustrating a part of a first end surface side of the stator.

According to the second embodiment, as illustrated, in the multi-rowed first coil segment CS1 and second coil segment CS2, bridge parts BB and BD with short crank parts CR2 and CR4 are arranged in the axial direction of the stator core 16, and bridge parts BA and BC with longer crank parts CR1 and CR2 are placed on top of these bridge parts. Furthermore, the bridge parts BA and BC are arranged overlapping each other in the radial direction of the stator core 16. This reduces the extending part height of the coil end, and further miniaturization can be achieved.

In detail, the first coil segment CS1 includes divided segments DS1 and DS2. A pair of first linear parts LA1 and LB1 of the first coil segment CS1 are located in the slot 20 and are radially aligned and adjacent to each other. For example, the first linear part LA1 is located in the innermost side of slot 20, and first linear part LB1 is located adjacent to the outer side of first linear part LA1 in the radial direction. In the first linear parts LA1 and LB1, the extending ends protruding from the second end surface 16b of the stator core 16 are bent inwardly in the radial direction of the stator core 16 and further bent axially. Thus, the extending ends of the first linear parts LA1 and LB1 shifted inward in the radial direction than the inner peripheral side ends of the slot 20, that is, than the inner periphery of the stator core 16.

The bridge part BA of the divided segment DS1 includes a first section SA1 extending from the extending end of the first linear part LA1 along the circumferential direction of the stator core 16 and substantially parallel to the second end surface 16b, first crank part CR1 extending from the terminal end of the first section SA1 sloping radially outward and substantially parallel to the second end surface 16b, and second section SA2 extending from the terminal end of the first crank part CR1 to the extending end of the second linear part LA2 along the circumferential direction and substantially parallel to the second end surface 16b. The first crank part CR1 is positioned approximately middle between the first linear part LA1 and the second linear part LA2. The bridge part BA is formed of a rectangular conductor which is bent in a thickness direction or a direction orthogonal to the thickness direction without twisting the rectangular conductor. For example, the second linear part LA2 is located in the slot 20 which is five slots away from first linear part LA1.

The bridge part BA of divided segment DS1 is opposed to the second end surface 16b with a space therebetween. The first section SA1 is located inwardly shifted from the inner edge of the stator core 16. By providing the first crank part CR1, the second section SA2 is shifted radially outward from the first section SA1 by about three times the thickness of the divided segment DS1. This means that the second linear part LA2 is arranged in the slot 20 to be shifted radially outward from the first linear part LA1 by one thickness thereof.

The bridge part BB of the divided segment DS2 includes a first section SB1 extending from the extending end of the first linear part LB1 along the circumferential direction of the stator core 16, second crank part CR2 extending from the terminal end of the first section SB1 sloping radially outward and substantially parallel to the second end surface 16b, and second section SB2 extending from the terminal end of the second crank part CR2 to the extending end of the second linear part LB2 along the circumferential direction and substantially parallel to the second end surface 16b. The second crank part CR2 is positioned approximately middle between the first linear part LB1 and the second linear part LB2. The bridge part BB is formed of a rectangular conductor which is bent in a thickness direction or a direction orthogonal to the thickness direction without twisting the rectangular conductor. For example, the second linear part LB2 is located in the slot 20 which is five slots away from first linear part LB1.

The first linear part LB1 and the second linear part LB2 are almost twice as shorter as the width of the rectangular conductor than the first and second linear parts LA1 and LA2 of the divided segment DS1 and extend axially from the stator core 16. As a result, the bridge part BB is substantially parallel to the second end surface 16b with a smaller spacing than the bridge part BA and is opposed to the second end surface 16b. The first section SB1 is located to be shifted inwardly from the inner edge of the slot 20 and approximately over the inner edge of the stator core 16. Furthermore, the first section SB1 is located to be shifted radially outward from the first section SA1 of the divided segment DS1 by the thickness of the rectangular conductor, and is located to be shifted downward (closer to the second end surface 16*b*) by the width of the rectangular conductor. The second crank part CR2 overlaps below the first crank part CR1 in the axial direction, and extends to cross the first crank part CR1. The extending part length (height in the radial direction) of the second crank part CR2 along the longitudinal direction of the rectangular conductor is less than half the extending part length of the first crank part CR1. As a result, the second section SB2 is positioned radially inward from the second section SA2 by the thickness of the rectangular conductor, and is also positioned axially downward (closer to the second end surface 16*b*) by the width of the rectangular conductor. The second linear part LB2 is located radially inward from the first linear part LB1 and is positioned on the innermost side in the slot 20.

As above, the bridge part BA of the divided segment DS1 and the bridge part BB of the divided segment DS2 extend to intersect in the radial direction, and the positional relationship of the first linear parts LA1 and LB1 is reversed from that of the second linear parts LA2 and LB2. That is, the first linear part LA1 is located inside of first linear part LB1 in the radial direction, and the second linear part LA2 is located outside of the second linear part LB2 in the radial direction.

The second coil segment CS2 positioned so as to sandwich the first coil segment CS1 from both sides in the circumferential direction includes divided segments DS3 and DS4. A pair of first linear parts LC1 and LD1 of the second coil segment CS2 are arranged in the slot 20 which is adjacent by one (outward in the circumferential direction) to the slot 20 in which the first linear parts LA1 and LB1 of the first coil segment CS1 are arranged, and are adjacent to each other in the radial direction. For example, the first linear part LC1 is located in the innermost side of the slot 20, and first linear part LD1 is adjacent to the first linear part LC1 in the outside of the radial direction. In the first linear parts LC1 and LD1, an extending end projecting from the second end surface 16*b* of the stator core 16 is bent inwardly the radial direction of the stator core 16 and further bent in the axial direction. Thus, the extending ends of the first linear parts LC1 and LD1 are shifted inward the radial direction than is the inner peripheral side end of the slot 20, that is, than the inner periphery of the stator core 16. Specifically, the extending end of the first linear part LC1 is shifted inward the radial direction greater than the first linear part LD1, for example, by three times the thickness of the first linear part.

The bridge part BC of the divided segment DS3 includes a first section SC1 extending from the extending end of the first linear part LC1 along the circumferential direction of the stator core 16 and substantially parallel to the second end surface 16*b*, first crank part CR3 extending from the terminal end of the first section SC1 sloping radially outward and substantially parallel to the second end surface 16*b*, second section SC2 extending from the terminal end of the first crank part CR3 to the extending end of the second linear part LA2 along the circumferential direction and substantially parallel to the second end surface 16*b*, and fifth crank part CR5 disposed in the intermediate part of the second section SC2 sloping radially outward and substantially parallel to the second end surface 16*b*. The first crank part CR3 is positioned approximately middle between the first linear part LC1 and the second linear part LC2. The extension part length of the first crank part CR3 (height in the radial direction) is formed almost three times the thickness of the rectangular conductor. On the other hand, the extension length of the fifth crank part CR5 is substantially the same as the thickness of the rectangular conductor.

The bridge part BC is formed of a rectangular conductor which is bent in a thickness direction or a direction orthogonal to the thickness direction without twisting the rectangular conductor. The second linear part LC2 is located in the slot 20 which is seven slots away from first linear part LC1, that is, in the slot 20 adjacent by one (outeard in the circumferential direction) to the slot 20 in which the second linear parts LA2 and LB2 of the first coil segment CS1 are arranged.

The first linear part LC1 and the second linear part LC2 are almost as wide as the width of the rectangular conductor than the first and second linear parts LA1 and LA2 of the divided segment DS1 and extend axially from the stator core 16. This allows the bridge part BC to face the second end surface 16*b* with a spacing which is almost equal to the bridge part BA, and furthermore, to be positioned inward in the radial direction of the bridge part BA to be opposed to the bridge part BA in the radial direction.

For example, the first section SC1 of the bridge part BC is shifted inward than the inner peripheral edge of the stator core 16. With the first crank part CR3, the second section SC2 is shifted from the first section SC1 outward in the radial direction by almost three times the thickness of the divided segment DS3. With the first crank part CR5, the end terminal part of the second section SC2 is further shifted outward in the radial direction by one thickness thereof. As a result, the second linear part LC2 is positioned in the slot 20 to be shifted from the first linear part LC1 radially outward by one thickness thereof. The first section SC1, first crank part CR3, second section SC2 of bridge part BC are disposed to overlap the first section SA1, first crank part CR1, and second section SA2 of the divided segment DS1, respectively, in the axial direction.

The bridge part BD of the divided segment DS4 includes a first section SD1 extending from the extending end of the first linear part LD1 along the circumferential direction of the stator core 16 and substantially parallel to the second end surface 16*b*, second crank part CR4 extending from the terminal end of the first section SD1 sloping radially outward and substantially parallel to the second end surface 16*b*, and second section SD2 extending from the terminal end of the second crank part CR4 to the extending end of the second linear part LD2 along the circumferential direction and substantially parallel to the second end surface 16*b*. The second crank part CR4 is positioned approximately middle between the first linear part LD1 and the second linear part LD2. The bridge part BD is formed of a rectangular conductor which is bent in a thickness direction or a direction orthogonal to the thickness direction without twisting the rectangular conductor. The second linear part LD2 is located in the slot 20 which is seven slots away from first linear part LD1.

The first linear part LD1 and the second linear part LD2 are shorter by the width of the rectangular conductor than the first and second linear parts LC1 and LC2 of the divided segment DS3 and extend axially from the stator core 16. As a result, the bridge part BD is substantially parallel to the second end surface 16*b* with a smaller spacing than the bridge part BC and is opposed to the second end surface 16*b*. The first section SD1 is located to be shifted inwardly from the inner edge of the slot 20 and approximately over the inner edge of the stator core 16. Furthermore, the first section SD1 is located to be shifted radially outward from the first section SC1 of the divided segment DS3 by three times the thickness of the rectangular conductor, and is located to be shifted downward (closer to the second end surface 16*b*) by the width of the rectangular conductor. The second crank part CR4 overlaps below the first crank part CR3 in the axial direction, and extends to cross the first crank part CR3. The extending part length (height in the radial direction) of the second crank part CR4 along the longitudinal direction of the rectangular conductor is less than one third of the extending part length of the first crank part CR3. As a result, the second section SD2 is positioned radially inward from the second section SC2 of the divided segment DS3 by the thickness of the rectangular conductor, and is also positioned axially downward (closer to the second end surface 16b) by the width of the rectangular conductor. That is, the second section SD2 is positioned between the second section SB2 of the divided segment DS2 and the second section SC2 of the divided segment DS3 and is arranged to overlap therewith in the axial direction.

As above, the second linear part LD2 is positioned radially inward with respect to the second linear part LC1 and positioned innermost side in the slot 20. That is, the first section SD1, second crank part CR4, and second section SD2 of the bridge part BD are arranged to overlap with the first section SB1, second crank part CR2, and second section SB2 of the divided segment DS2 in the radial direction.

As above, the bridge part BC of the divided segment DS3 and the bridge part BD of the divided segment DS4 extend to intersect in the radial direction, and the positional relationship of the first linear parts LC1 and LD1 is reversed from that of the second linear parts LC2 and LD2. That is, the first linear part LC1 is located inside of first linear part LD1 in the radial direction, and the second linear part LD2 is located outside of the second linear part LD2 in the radial direction.

In the second embodiment, the other structure of the stator is identical to the first embodiment described above.

In the second embedment, the first and second sections of the bridge part of the divided segment do not necessarily have to be parallel (or nearly parallel) to the second end surface 16b of the stator core 16, and various shapes can be used.

In the second embodiment structured as above, the dislocation configuration that reverses the positional relationship between the two ends of the first coil segment CS1 and the second coil segment CS2 is achieved by bending the divided segments DS1, DS2, DS3, and DS4 in the thickness direction or in the direction perpendicular to the thickness direction without twisting them to lane change the first sections SA1, SB1, SC1, and SD1, and the second sections SA2, SB2, SB3, and SB4. Therefore, the manufacturing and assembly of segment coils are easier than in the case of twisting.

Furthermore, according to the present embodiment, in the multi-rowed first coil segment CS1 and second coil segment CS2, the first crank part CR1 and CR3 and the second crank part CR2 and CR4 of the bridge part are located directly above the slots between coil segments of other phases adjacent to each other in the circumferential direction, and can be positioned near the coil segments of other phases without interfering with the coil segments of other phases. Therefore, the coil end 18b can be made smaller and simpler.

Furthermore, in the present embodiment, in the multi-rowed first coil segment CS1 and the second coil segment CS2, the bridge parts BB and BD with the crank parts CR2 and CR4, which are shorter, are placed to overlap with each other in the axial direction of the stator core 16, and above the bridge parts, the bridge parts BA and BC with the crank parts CR1 and CR2, which are longer are arranged. Furthermore, the bridge parts BA and BC are arranged to overlap with each other in the radial direction of the stator core 16.

Thus, the height of the coil ends can be reduced, and further miniaturization can be achieved.

As can be understood from the above, according to the second embodiment, the stator of rotary electric machine in which the size of the coil end can be reduced while suppressing the generation of eddy currents can be achieved.

Third Embodiment

Figure 13:
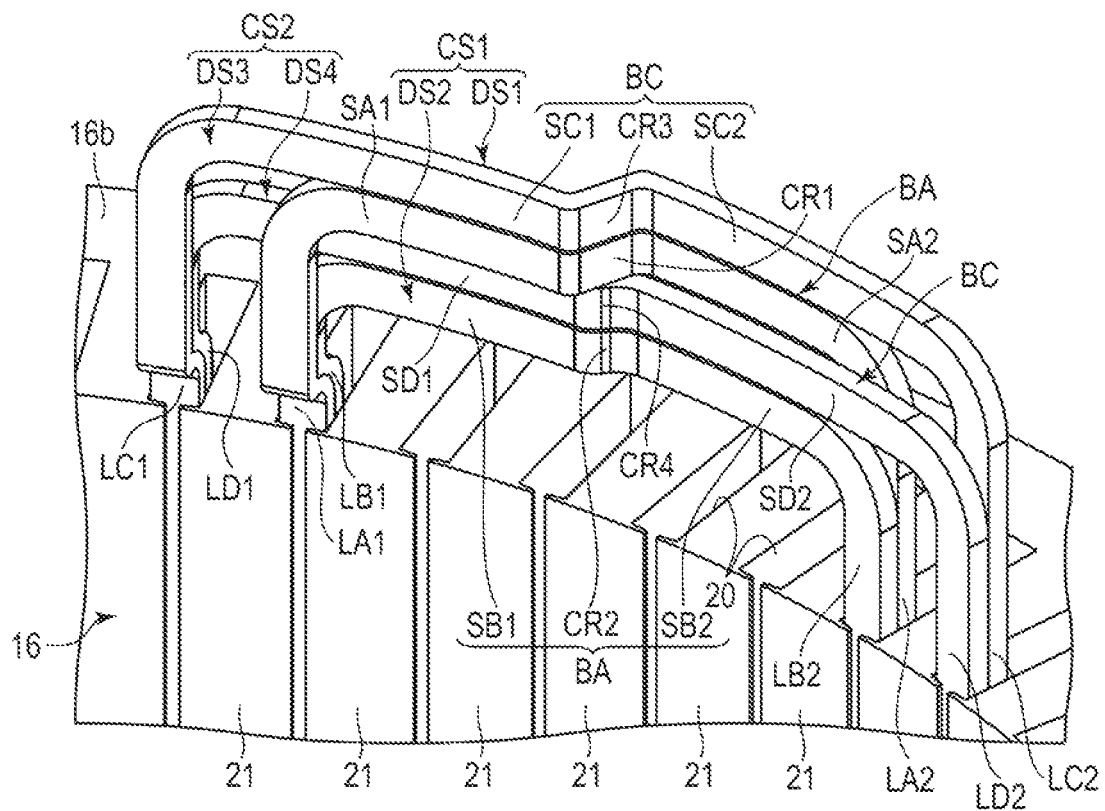
FIG. 13 is a perspective view illustrating a part of a first end surface side of a stator of a third embodiment, and multi-row inner peripheral side segment coils.
Figure 14:
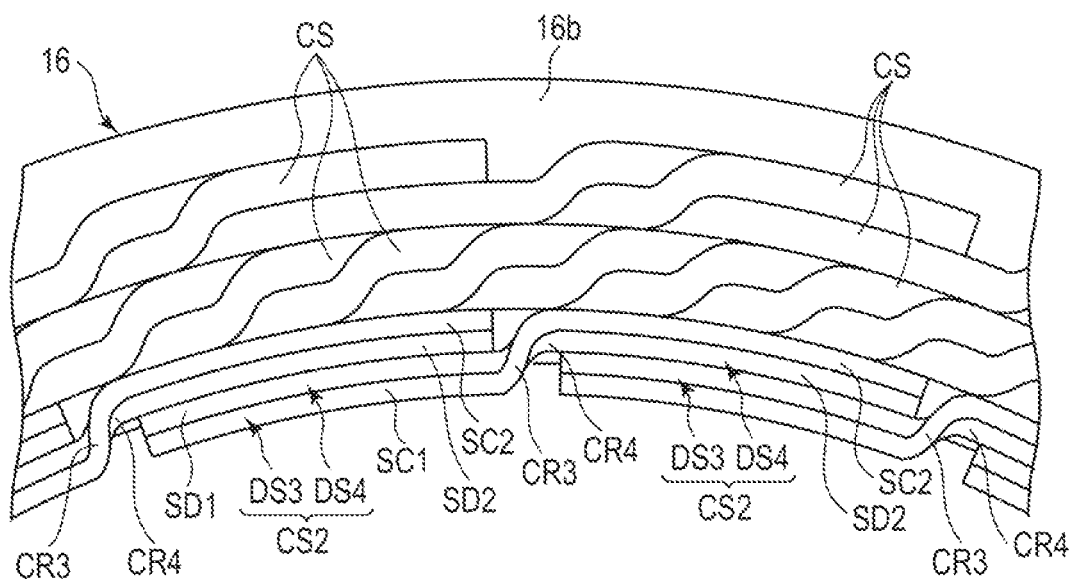
FIG. 14 is a plan view illustrating a part of the first end surface side of the stator of the third embodiment.

FIG. 13 is a perspective view illustrating an arrangement structure of a first coil segment CS1 and a second coil segment CS2 of one phase of a stator of the third embodiment. FIG. 14 is a plan view illustrating a part of a first end surface side of the stator.

In the second embodiment described above, the bridge part BC of the divided segment DS3 of the second coil segment CS2 is arranged to overlap with the bridge part BA of the divided segment DS1 of the first coil segment CS1 in the radial direction of the stator core 16. In contrast, according to the third embodiment, as shown in the figure, a bridge part BC of a divided segment DS3 overlaps with a bridge part BA of a divided segment DS1 in the radial direction of a stator core 16.

In detail, in a second coil segment CS2, a first linear part LC1 of the divided segment DS3 is located on the innermost side of a slot 20. In the first linear part LC1, the extending part protruding from the second end surface 16b of the stator core 16 is bent inward in the radial direction of the stator core 16 and further bent in the axial direction. Thus, the extending end of the first linear part LC1 is located radially inward from the inner peripheral edge of the slot 20 by the thickness of the first linear part, for example.

The bridge part BC of the divided segment DS3 includes a first section SC1 extending from the extending end of the first linear part LC1 along the circumferential direction of the stator core 16 and substantially parallel to the second end surface 16b, first crank part CR3 extending from the terminal end of the first section SC1 sloping radially outward and substantially parallel to the second end surface 16b, and second section SC2 extending from the terminal end of the first crank part CR3 to the extending end of the second linear part LA2 along the circumferential direction and substantially parallel to the second end surface 16b. The first crank part CR3 is positioned approximately middle between the first linear part LC1 and the second linear part LC2. The extension length (height in the radial direction) of the first crack part CR3 is formed to be approximately three times the thickness of the rectangular conductor.

The bridge part BC is formed of a rectangular conductor which is bent in a thickness direction or a direction orthogonal to the thickness direction without twisting the rectangular conductor. The second linear part LC2 is located in the slot 20 which is seven slots away from first linear part LC1, that is, in the slot 20 adjacent by one (outeard in the circumferential direction) to the slot 20 in which the second linear parts LA2 and LB2 of the first coil segment CS1 are arranged.

The first linear part LC1 is almost as wide as the width of the rectangular conductor than the first linear part LA1 of the divided segment DS1 and extends axially from the stator core 16. Thus, the first section SC1, first crack part CR3, and second section SC2 of the bridge part BC are arranged to overlap with the first section SA1, first crank part CR1, second section SA2 of the bridge part BA of the divided segment DS1, respectively, in the radial direction.

In the third embodiment, the other structures of the first coil segment CS1 and the second coil segment CS2 are identical to the second embodiment described above. In the third embediment, the first and second sections of the bridge part of the divided segment do not necessarily have to be parallel (or nearly parallel) to the second end surface 16b of the stator core 16, and various shapes can be used.

In the third embodiment structured as above, the dislocation configuration that reverses the positional relationship between the two ends of the first coil segment CS1 and the second coil segment CS2 is achieved by bending the divided segments DS1, DS2, DS3, and DS4 in the thickness direction or in the direction perpendicular to the thickness direction without twisting them to lane change the first sections SA1, SB1, SC1, and SD1, and the second sections SA2, SB2, SB3, and SB4. Therefore, the manufacturing and assembly of segment coils are easier than in the case of twisting.

Furthermore, according to the present embodiment, in the multi-rowed first coil segment CS1 and second coil segment CS2, the first crank part CR1 and CR3 and the second crank part CR2 and CR4 of the bridge part are located directly above the slots between coil segments of other phases adjacent to each other in the circumferential direction, and can be positioned near the coil segments of other phases without interfering with the coil segments of other phases. Therefore, the coil end 18b can be made smaller and simpler.

As can be understood from the above, according to the third embodiment, the stator of rotary electric machine in which the size of the coil end can be reduced while suppressing the generation of eddy currents can be achieved.

In the above mentioned embodiments, the coil segment located at the innermost periphery of the slot 20 is shown with a structure where the coil segment is divided into two divided segments, but the multi-row is not limited to two, but can be divided into three or four divided segments.

(First Modification)

Figure 15:
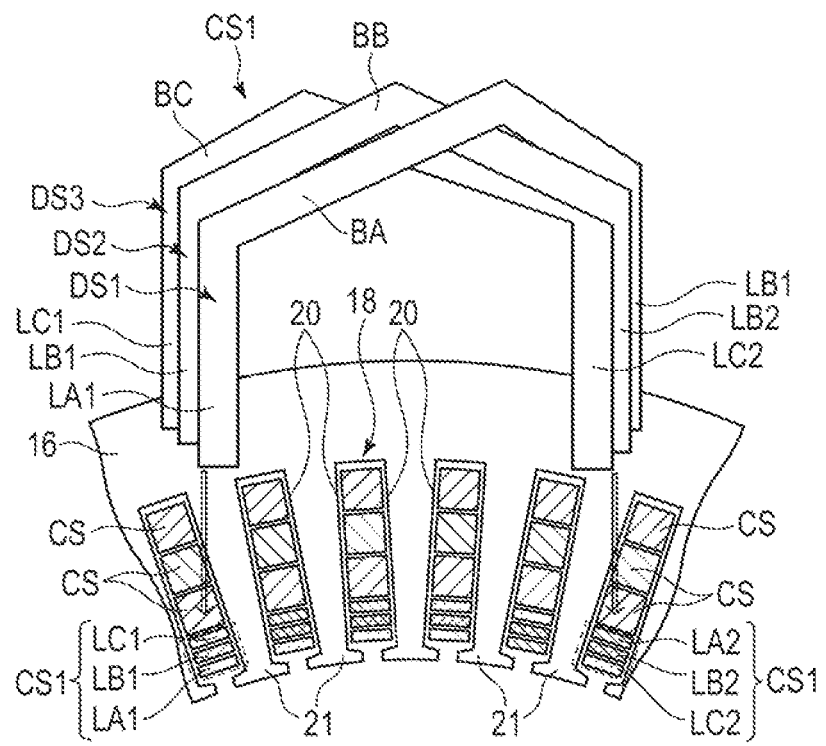
FIG. 15 is a schematic view illustrating a part of a cross-section of a stator of a first modification and divided segments.

FIG. 15 schematically illustrates a portion of a cross-section of a sator of a first modification and a divided segment thereof.

As shown in the figure, in the first modification, the coil segment CS1 located on the innermost side of the slot 20 is divided into three divided segments (first, second, and third divided segments) DS1, DS2, and DS3. The divided segments DS1, DS2, and DS3 are formed of a rectangular conductor with a cross-sectional area of about ⅓ of the cross-sectional area of the other coil segments CS, i.e., a rectangular conductor that is thinner than the other coil segments.

The divided segment DS1 integrally includes a first linear part LA1 and a second linear part LA2, and a bridge part BA positioned outside the stator core 16 to be opposed to the second end surface 16b and connecting the first linear part LA1 and the second linear part LA2. The divided segment DS2 integrally includes a first linear part LB1 and a second linear part LB2, and a bridge part BB positioned outside the stator core 16 to be opposed to the second end surface 16b and connecting the first linear part LB1 and the second linear part LB2. Similarly, the divided segment DS3 integrally includes a first linear part LC1 and a second linear part LC2, and a bridge part BC positioned outside the stator core 16 to be opposed to the second end surface 16b and connecting the first linear part LC1 and the second linear part LC2.

The three first linear parts LA1, LB1, and LC1 are located in the slot 20 and are aligned in the radial direction and adjacent to each other. For example, the first linear part LA1 is located on the innermost side of slot 20, first linear part LB1 is located outside of the first linear part LA1 in the radial direction, and the first linear part LC1 is located outside of the first linear part LB1 in the radial direction. In one example, the second linear parts LA2, LB2, and LC2 are located five slots away from the first linear parts LA1, LB1, and LC1 and are adjacent to each other. The bridge part BA is disposed radially intersecting the stator core 16 with respect to the bridge part BB, and a portion of the bridge part BA is disposed radially outside of the bridge part BB. The bridge part BC is disposed radially intersecting the stator core 16 with respect to the bridge part BB, and a portion of bridge part BC is located on the inner side of the bridge part BB in the radial direction.

As a result, the second linear parts LA2 and LC2 are arranged in the opposite relationship to the first linear parts LA1 and LC1, and the arrangement relationship is reversed. In other words, the second linear part LC2 is placed on the innermost side of the slot 20, and the second linear part LA2 is positioned to be adjacent thereto in the outer side of the second linear part LC2 across the second linear part LB2.

Any of the structures of the first, second, and third embodiments above can be applied to the bridge parts BA, BB, and BC.

As described above, by increasing the number of coil segments, the cross-sectional area of the conductor orthogonal to the magnetic flux crossing the slot 20 in the circumferential direction can be further reduced, and eddy currents generated in the conductor at high speeds and losses resulting therefrom can be reduced. By crossing the bridge parts of the three divided segments and shifting the positional relationship between the first linear parts and the second linear parts, the generation of circulating currents can be suppressed. Therefore, low loss can be achieved with the multi-row innermost coil without creating a new loss increase factor.

(Second Modification)

Figure 16:
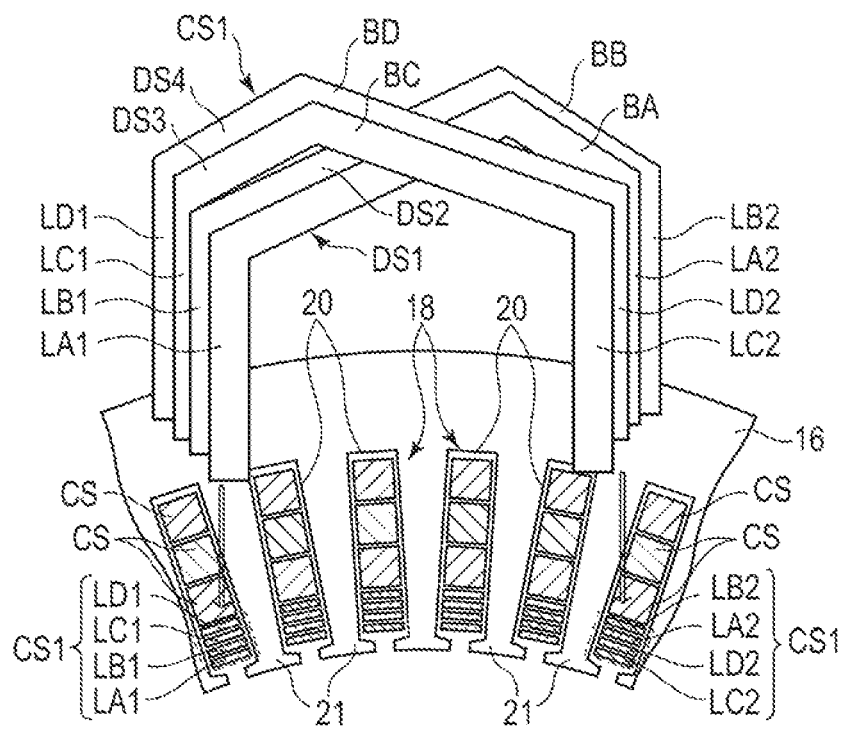
FIG. 16 is a schematic view illustrating a part of a cross-section of a stator of a second modification and divided segments.

FIG. 16 schematically illustrates a portion of a cross-section of a sator of a second modification and a divided segment thereof.

As shown in the figure, in the second modification, the coil segment CS1 located on the innermost side of the slot 20 is divided into four divided segments (first, second, third, and fourth divided segments) DS1, DS2, DS3, and DS4. The divided segments DS1, DS2, DS3, and DS4 are formed of a rectangular conductor with a cross-sectional area of about ¼ of the cross-sectional area of the other coil segments CS.

As with the divided segments DS1, DS2, and DS3, the divided segment DS4 integrally includes a first linear part LD1 and a second linear part LD2, and a bridge part BD positioned outside the stator core 16 to be opposed to the second end surface 16b and connecting the first linear part LD1 and the second linear part LD2.

The four first linear parts LA1, LB1, LC1, and LD1 are located in the slot 20 and are aligned in the radial direction and adjacent to each other. For example, the first linear part LA1 is located on the innermost side of slot 20, and outside thereof, the first parts LB1, LC1, and LD1 are arranged in order. In one example, the second linear parts LA2, LB2, LC2, and LD2 are arranged in a slot 20 five slots away from the first linear parts LA1, LB1, LC1, and LD1 and are adjacent to each other.

The bridge parts BA and BB of the divided segment DS1 and DS2 are disposed radially intersecting the stator core 16 with respect to the bridge parts BC and BD of the divided segments DS3 and DS4, and a portions of the bridge parts BA and BB are disposed radially outside of the bridge parts BB and BD.

As a result, the second linear parts LA2 and LB2 and the second linear parts LC2 and LD2 are arranged in the opposite relationship to the first linear parts LA1 and LB1, and the arrangement relationship is reversed. In other words, the second linear part LC2 is placed on the innermost side of the slot 20, and outside thereof, the second linear parts LD2, LA2, and LB2 are arranged in order.

Any of the structures of the first, second, and third embodiments above can be applied to the bridge parts BA, BB, BC, and BD.

As described above, in the second modification, by increasing the number of coil segments, the cross-sectional area of the conductor orthogonal to the magnetic flux crossing the slot 20 in the circumferential direction can be further reduced, and eddy currents generated in the conductor at high speeds and losses resulting therefrom can be reduced. By crossing the bridge parts of the four divided segments and shifting the positional relationship between the first linear parts and the second linear parts, the generation of circulating currents can be suppressed. Therefore, low loss can be achieved with the multi-row innermost coil without creating a new loss increase factor.

(Third Modification)

Figure 17:
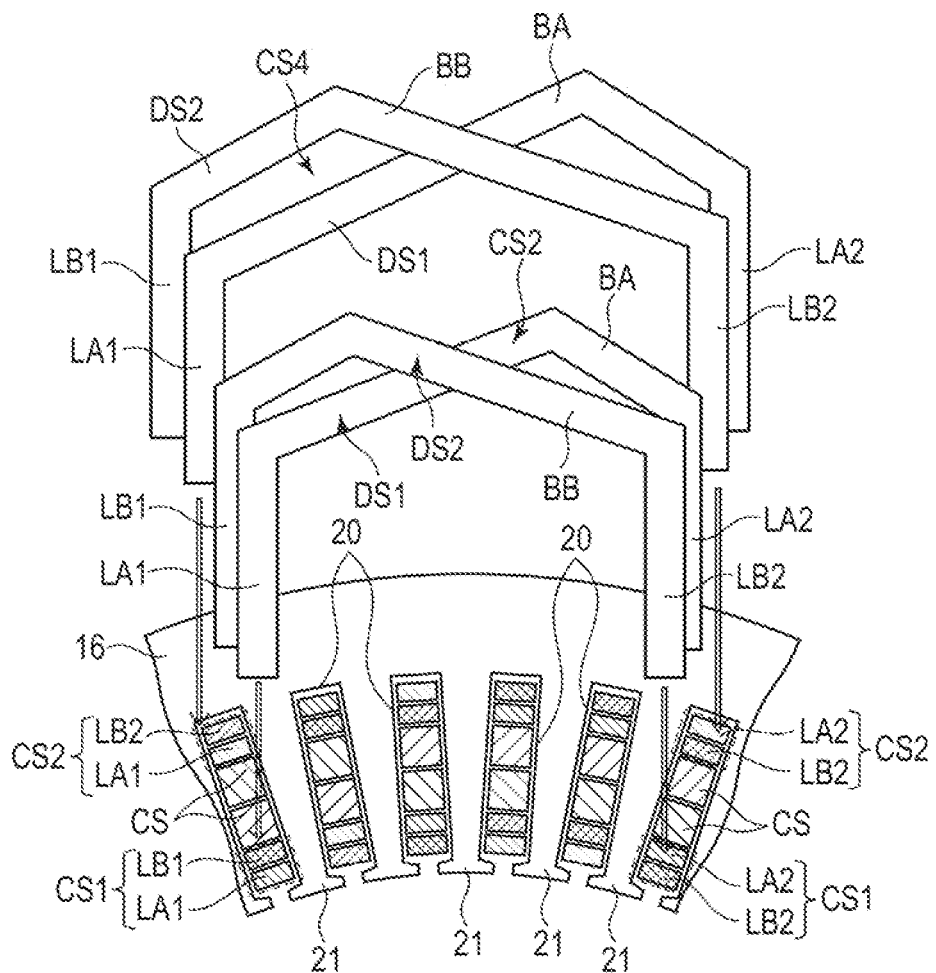
FIG. 17 is a schematic view illustrating a part of a cross-section of a stator of a third modification and divided segments.

FIG. 17 schematically illustrates a portion of a cross-section of a sator of a third modification and a divided segment thereof.

As shown in the figure, in the third modification, in addition to the coil segment CS1 located on the innermost side of the slot 20, the coil segment CS4 located on the outermost side of the slot 20 is divided into two divided segments DS1 and DS2. The divided segments DS1 and DS2 are formed of a rectangular conductor with a cross-sectional area of about ½ of the cross-sectional area of the other coil segments CS.

The divided segment DS1 of the coil segment CS4 integrally includes a first linear part LA1 and a second linear part LA2, and a bridge part BA positioned outside the stator core 16 to be opposed to the second end surface 16b and connecting the first linear part LA1 and the second linear part LA2. Similarly, the divided segment DS2 integrally includes a first linear part LB1 and a second linear part LB2, and a bridge part BB positioned outside the stator core 16 to be opposed to the second end surface 16b and connecting the first linear part LB1 and the second linear part LB2.

The two first linear parts LA1 and LB1 are located in the slot 20 and are aligned in the radial direction and adjacent to each other. For example, the first linear part LB1 is located on the outermost side of the slot 20 and the first linear part LA1 is located to be adjacent radially inward to the first linear part LB1. In one example, the second linear parts LA2 and LB2 are arranged to intersect in the radial direction of the stator core 16, and a part of the bridge part BA1 is positioned radially inward the bridge part BB.

As a result, the second linear parts LA2 and LB2 are arranged in the opposite relationship to the first linear parts LA1 and LB1, and the arrangement relationship is reversed. In other words, the second linear part LA2 is placed on the innermost side of the slot 20, and the second linear part LB2 is adjacent radially inward to the second linear part LA2.

Any of the structures of the first, second, and third embodiments above can be applied to the bridge parts BA, BB, BC, and BD. Furthermore, the structure of the coil segment CS1 can be applied to any of the structures of the first to third embodiments above.

As described above, by multi-rowing the innermost coil segment CS1 and the outermost coil segment CS4 in the slot 20, the cross-sectional area of the conductor orthogonal to the magnetic flux crossing the slot 20 in the circumferential direction can be further reduced, and eddy currents generated in the conductor at high speeds and losses resulting therefrom can be reduced. By crossing the bridge parts of the two divided segments DS1 and DS2 and shifting the positional relationship between the first linear parts and the second linear parts, the generation of circulating currents can be suppressed. Therefore, low loss can be achieved with the multi-row innermost coil without creating a new loss increase factor.

Note that, in the third modification, the number of multi-rowed coil segments is not limited to two, and three or more divided segments may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of coil turns and the number of coil segments installed are not limited to the above mentioned embodiments, but can be increased or decreased as needed. For example, linear parts with four or eight segments may be arranged in one slot. The dimensions, material, shape, etc., of the rotors are not limited to the above-mentioned embodiment, but can be changed in various ways according to the design. The rotors and motors for the embodiments are not limited to permanent magnet field motors, but can also be applied to induction motors.

What is claimed is:

1. A stator of rotary electric machine, comprising:
   a stator core including an annular yoke with a central axis line and a plurality of teeth extending from an inner periphery of the yoke, in which a slot is formed between adjacent teeth; and
   multi-phase segment coils each including a plurality of coil segments each comprising a first linear part and a second linear part arranged in different slots and a bridge part positioned outside the stator core to connect the first linear part and the second linear part together, the coil segment formed of a rectangular conductor, wherein,
   given that a direction of the central axis line is an axial direction, a direction orthogonal to the central axis line is a radial direction, and a direction about the central axis line is a circumferential direction,
   a plurality of first linear parts or second linear parts are aligned in the radial direction in the slot,
   at least an innermost coil segment in the slot is structured with a plurality of divided segments adhered together, each divided segment including a first linear part and a second linear part, and a bridge part positioned outside the stator core to connect the first linear part and the second linear part together, and formed of a rectangular conductor cross-sectional area of which is smaller than the rectangular conductor,
   the bridge parts of the divided segments are arranged to cross each other in the radial direction,
   the first linear parts of the divided segments are, in the slot, aligned in a first direction of the radial direction and the second linear parts are, in the slot, aligned in an opposite direction of the first direction,
   the innermost coil segment is structured with a first coil segment including a first divided segment and a second divided segment, and a second coil segment including a third divided segment and a fourth divided segment and arranged to sandwich the first coil segment from both sides in the circumferential direction, a bridge part of the first divided segment includes a first section extending from an extending end of the first linear part in the circumferential direction, a first crank part bending by a first length from the first section to an outer peripheral side in the radial direction, and a second section extending from the first crank part to an extending end of the second linear part in the circumferential direction and positioned to be shifted from the first section by the first length outward in the radial direction, a bridge part of the second divided segment includes a first section extending from the extending end of the first linear part in the circumferential direction, a second crank part bending by a second length which is shorter than the first length from the first section to the outer peripheral side in the radial direction, and a second section extending from the second crank part to the extending end of the second linear part in the circumferential direction and positioned to be shifted from the first section by the second length outward in the radial direction, and the first crank part and the second crank part are arranged to overlap with each other in the axial direction, and the second crank part extends to cross the first crank part.

2. The stator of rotary electric machine of claim 1, wherein a bridge part of the third divided segment includes a first section extending from an extending end of the first linear part in the circumferential direction, a third crank part bending by a first length from the first section to an outer peripheral side in the radial direction, and a second section extending from the third crank part to the extending end of the second linear part in the circumferential direction and positioned to be shifted from the first section by the first length outward in the radial direction, a bridge part of the fourth divided segment includes a first section extending from the extending end of the first linear part in the circumferential direction, a fourth crank part bending by a second length which is shorter than the first length from the first section to the outer peripheral side in the radial direction, and a second section extending from the fourth crank part to the extending end of the second linear part in the circumferential direction and positioned to be shifted from the first section by the second length outward in the radial direction, and the third crank part and the fourth crank part are arranged to overlap with each other in the axial direction, and the fourth crank part extends to cross the third crank part.

3. The stator of rotary electric machine of claim 2, wherein the third crank part is arranged to overlap with the first crank part in the axial direction, the second crank part is arranged to overlap with the third crank part in the axial direction, and the fourth crank part is arranged to overlap with the second crank part in the axial direction.

4. The stator of rotary electric machine of claim 2, wherein the fourth crank part is arranged to overlap with the second crank part in the axial direction, the first crank part and the third crank part are arranged to overlap with the fourth crank part in the axial direction and overlap with each other in the radial direction and the circumferential direction.

5. The stator of rotary electric machine of claim 2, wherein the fourth crank part is arranged to overlap with the second crank part in the axial direction, the first crank part is arranged to overlap with the fourth crank part in the axial direction, and the third crank part is arranged to overlap with the first crank part in the axial direction.

6. The stator of rotary electric machine of claim 1, wherein the first coil segment further includes a third divided segment, and the first linear parts of the first, second, and third divided segments are, in the slot, aligned in the first direction of the radial direction, and the second linear parts of the first, second, third divided segments are, in the other slot, aligned in the opposite direction of the first direction.

7. The stator of rotary electric machine of claim 1, wherein the outermost coil segment in the slot is structured with a plurality of divided segments adhered together, each divided segment including a first linear part and a second linear part, and a bridge part positioned outside the stator core to connect the first linear part and the second linear part together, and formed of a rectangular conductor cross-sectional area of which is smaller than the rectangular conductor, the bridge parts of the divided segments are arranged to cross each other in the radial direction, and the first linear parts of the divided segments are, in the slot, aligned in a first direction of the radial direction and the second linear parts are, in the other slot, aligned in an opposite direction of the first direction.

* * * * *